United States Patent [19]
Forrer et al.

[11] Patent Number: 5,808,828
[45] Date of Patent: Sep. 15, 1998

[54] INSTALLATION INTENDED FOR AUTOMATIC RECORDING AND/OR READOUT ONTO OR FROM INFORMATION CARRIERS

[76] Inventors: Andreas Forrer, Léon Berthoud 7, CH-2000 Neuchâtel; Dominique Pisino, Marnière 22, CH-2068 Hauterive, both of Switzerland

[21] Appl. No.: 438,407

[22] Filed: May 10, 1995

Related U.S. Application Data

[63] Continuation of Ser. No. 181,589, Jan. 14, 1994, abandoned.

[30] Foreign Application Priority Data

Jan. 19, 1993 [FR] France .................................. 93 00569

[51] Int. Cl.⁶ ............................ G11B 15/68; G11B 17/22
[52] U.S. Cl. ............................... 360/92; 369/36; 369/178
[58] Field of Search ............................... 360/92, 34, 36, 360/38, 39, 178, 191–194

[56] References Cited

U.S. PATENT DOCUMENTS

| | | | |
|---|---|---|---|
| 3,920,195 | 11/1975 | Sills et al. | 242/180 |
| 4,685,095 | 8/1987 | Rudy et al. | 369/36 |
| 4,937,690 | 6/1990 | Yamashita et al. | 360/92 |
| 5,054,836 | 10/1991 | Schulz | 294/116 |
| 5,084,859 | 1/1992 | Ishibashi et al. | 369/34 |
| 5,108,246 | 4/1992 | Baur | 414/223 |
| 5,418,732 | 5/1995 | McFadin | 364/478 |

FOREIGN PATENT DOCUMENTS

| | | | |
|---|---|---|---|
| 0289986 | 11/1988 | European Pat. Off. | 360/92 |
| 0426456 | 5/1991 | European Pat. Off. | |
| 0464382 | 6/1991 | European Pat. Off. | |
| 3621790 | 6/1986 | Germany | |
| 4207596 | 4/1993 | Germany | 360/92 |
| 5680848 | 7/1981 | Japan | 360/92 |
| 62-239370 | 10/1987 | Japan | |
| 1285056 | 11/1989 | Japan | 360/92 |

Primary Examiner—Stuart S. Levy
Assistant Examiner—William J. Klimowicz
Attorney, Agent, or Firm—Griffin, Butler Whisenhunt & Szipl

[57] ABSTRACT

This installation includes an arrangement for filing information carriers (for example record library (DT) for compact discs) capable of actuation by a transfer arrangement (8) in order to place the carriers selectively into recording/reading apparatus (2). The loading and unloading of the filing arrangement (DT) can be obtained by use of a temporary storage arrangement (7) preferably taking the form of a displaceable cassette. The latter can be actuated by the transfer arrangement (8) in the same manner that this actuates the record library. The transfer and recording/reading operations of the installation are controlled by a suitably programmed computer (0). The use in particular is for radio broadcasting of audio programs from a collection of compact discs.

1 Claim, 22 Drawing Sheets

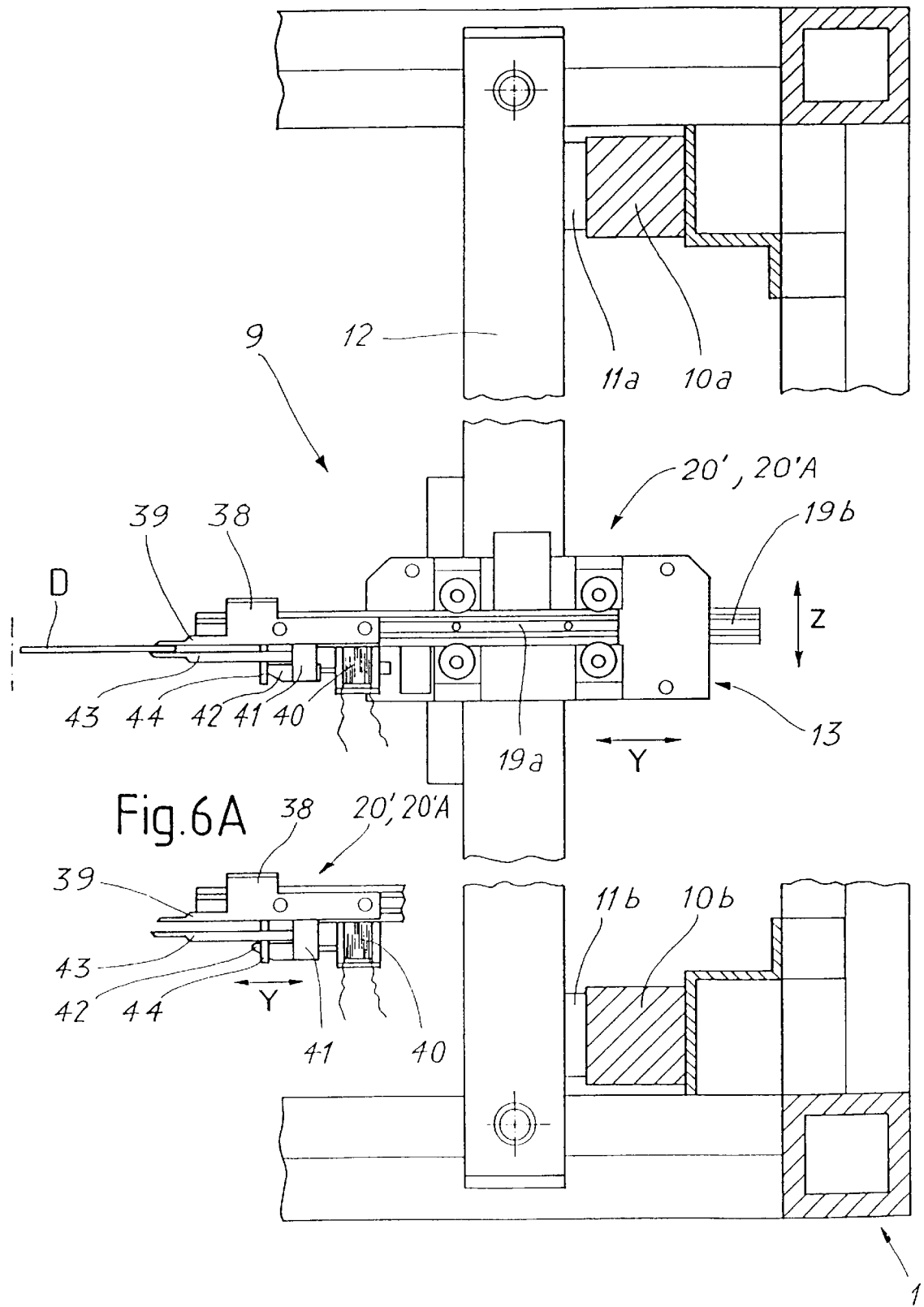

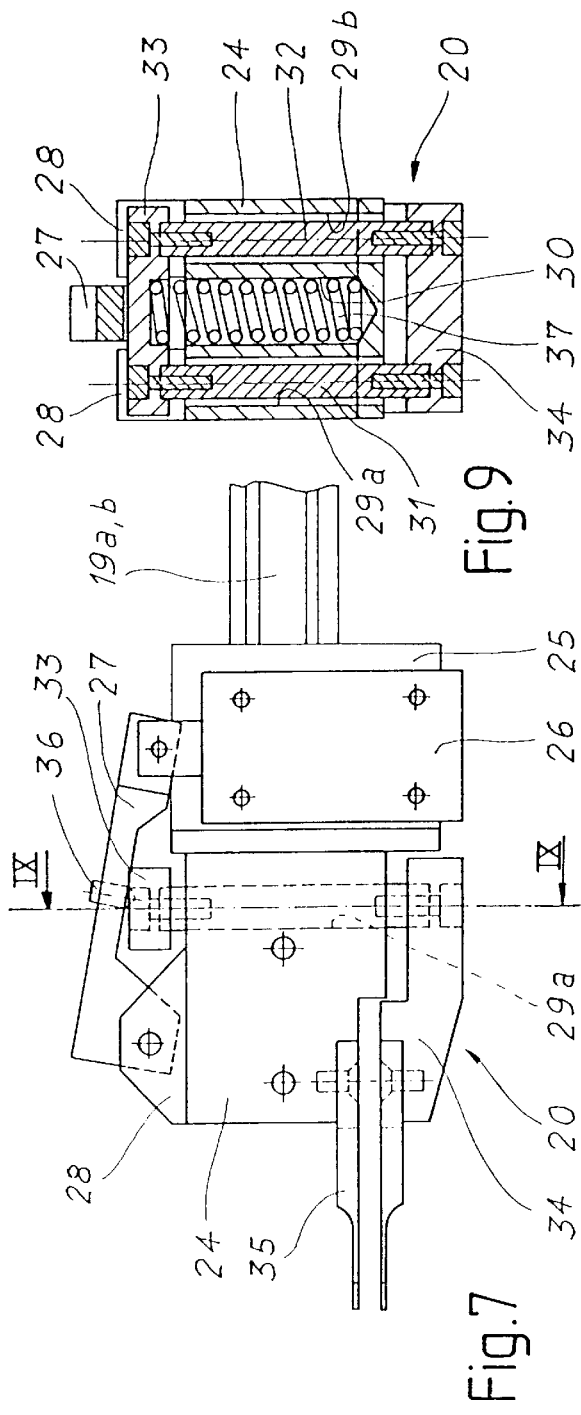
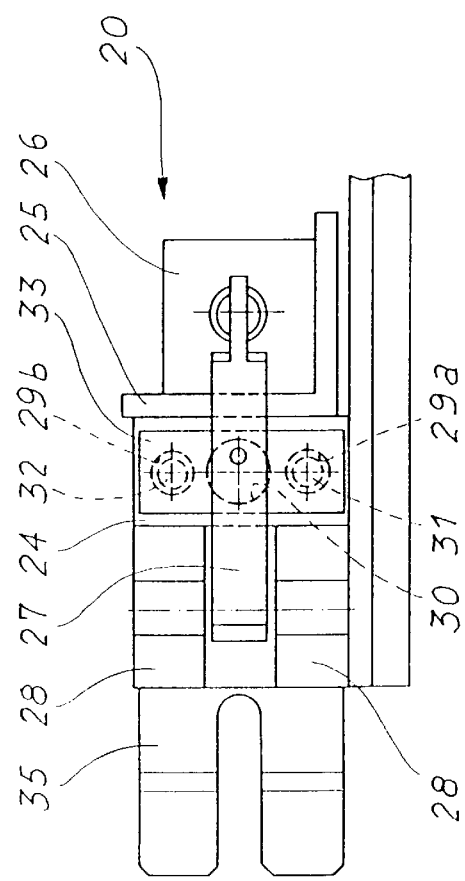
Fig. 7
Fig. 8
Fig. 9

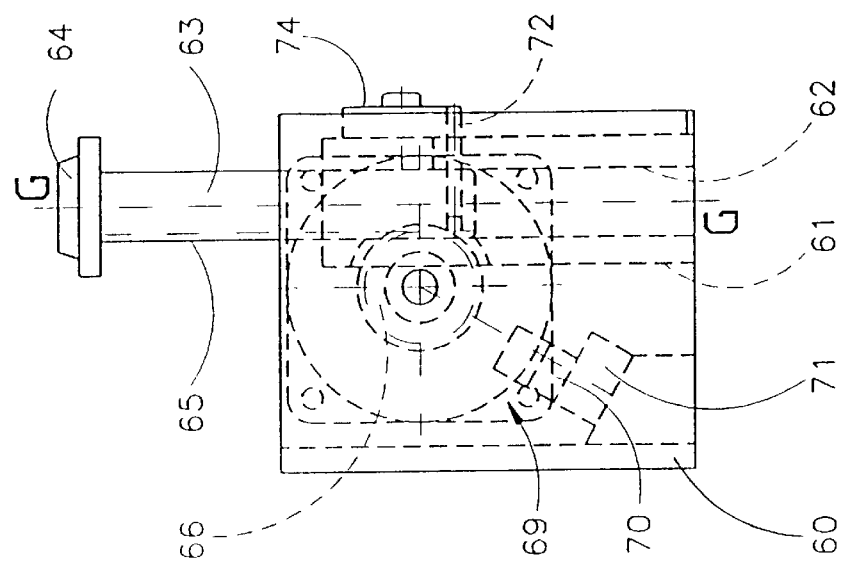
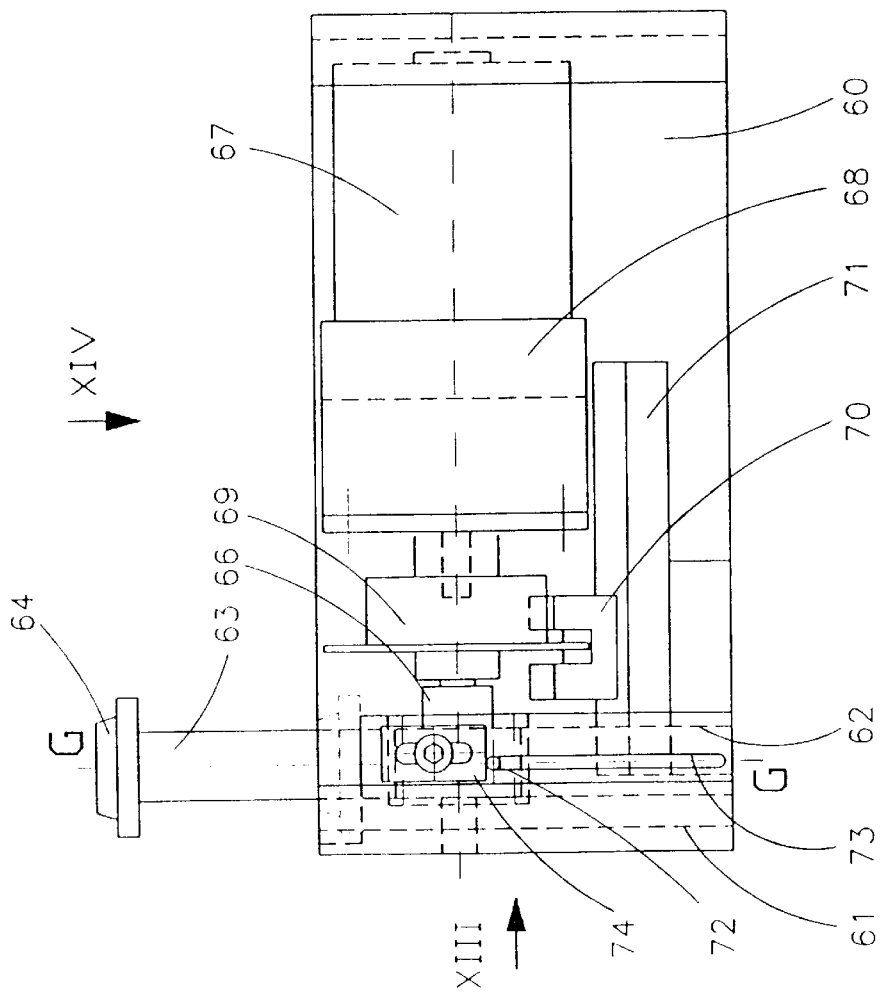
Fig. 13
Fig. 12

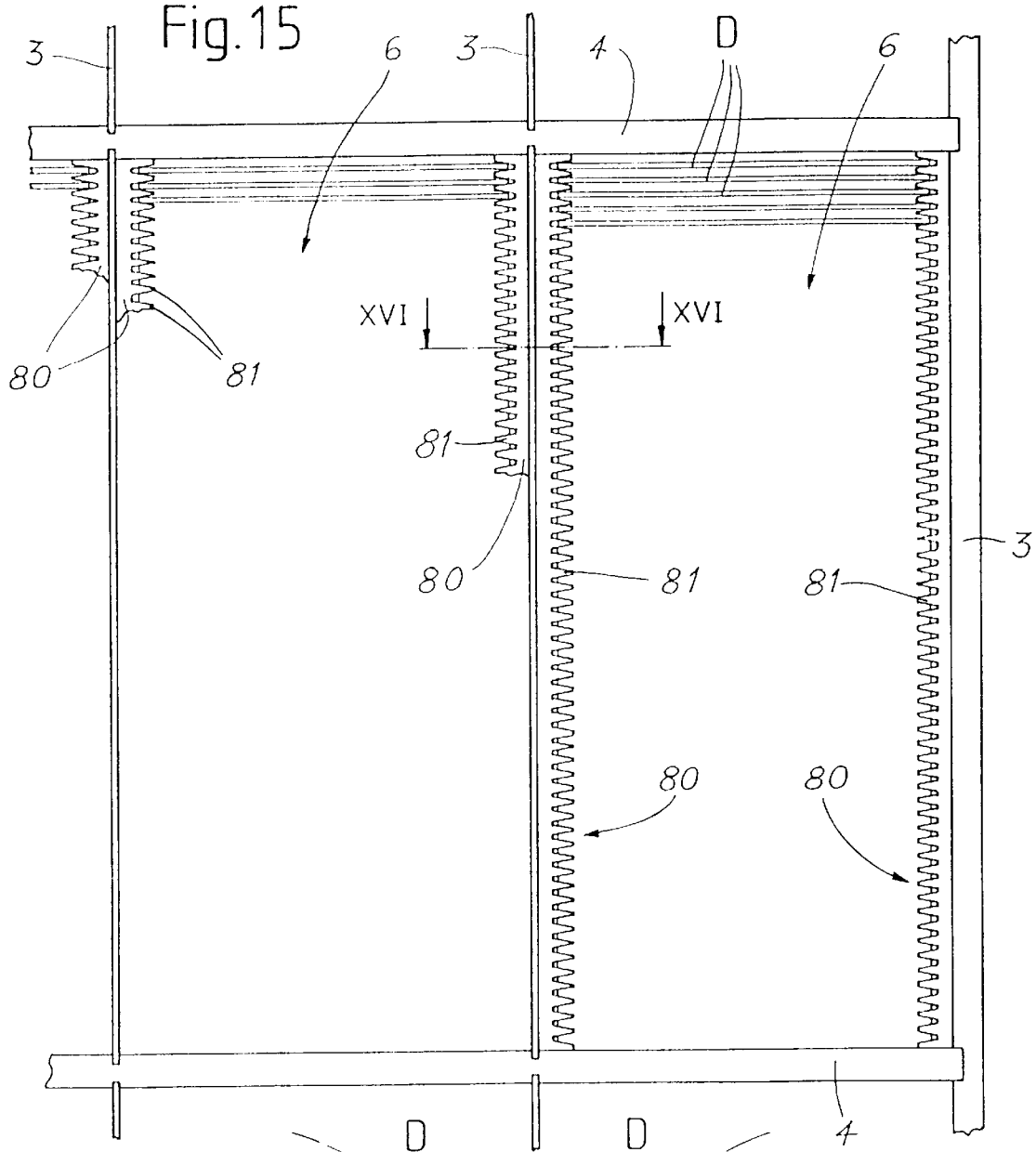
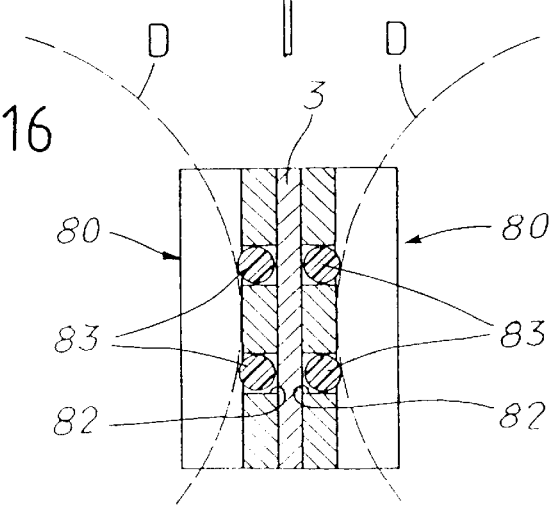

ically recording and/or readout onto or from information carriers such as magnetic tapes, audio or video discs whether compact or not and, in a general manner, of every carrier capable of bearing recoverable information under any form whatsoever. Thus, the invention can also be applied to information carriers such as photographic transparencies or carriers containing information in a digital form.

INSTALLATION INTENDED FOR AUTOMATIC RECORDING AND/OR READOUT ONTO OR FROM INFORMATION CARRIERS

This is a continuation of application Ser. No. 08/181,589, filed Jan. 14, 1994, now abandoned.

The present invention relates to an installation intded for automatic recording and/or readout onto or from information carriers such as magnetic tapes, audio or video discs whether compact or not and, in a general manner, of every carrier capable of bearing recoverable information under any form whatsoever. Thus, the invention can also be applied to information carriers such as photographic transparencies or carriers containing information in a digital form.

BACKGROUND OF THE INVENTION

More specifically, the invention concerns such an installation, in particular of the professional type, capable of storing a very large number of record carriers and of reading the information which is written thereon by means of an entirely automatic procedure of searching for the carriers and of filing them following reading, such procedure being preferably computer controlled. Such installations are employed in particular in radio or television broadcasting stations in which it is desirable that the procedure of choosing and reading of the carriers can be accomplished automatically and in a manner programmed in advance.

Although it is not specifically limited thereto, the invention can be employed with advantage for reading from a disc library of compact discs, whatever be moreover the nature of the information which is inscribed thereon.

According to patent document DE 3 621 790, an installation of the general type indicated hereinabove is known and intended more specifically for use with magnetic tape cassettes. Such known installation includes several cassette storage columns in which the cassettes are arranged over several circular stages. The columns themselves are arranged around a central space in which can manoeuvre a cassette handling mechanism intended to take them out from the storage columns, introduce them selectively into several cassette readers, remove them therefrom and finally restore them in the storage columns. Such latter are each fitted out with a handling device communicating with the handling mechanism of the central space and assuring transfer of the cassettes from and to their storage location towards and from the central space.

Thanks to the presence of several cassette readers, it is possible with this installation to bring about an audio dissolve, that is to say, to restore recordings from two different cassettes without interruption, one of the recordings being able to be progressively substituted for the other, which is a customary procedure in the technique of radio broadcasting or of audio illustration, for example. It is to be noted that this known installation can be employed, with due alteration of details, with compact discs and, in general, with all known record carriers.

It is evident that an installation of this type is useful only if the contents of the magazine or magazines of record carriers can be easily changed, above all in the domain of radio or television broadcasting. Effectively, such content must follow the appearance of new editions, indeed be at all times in conformity with currently fashionable recordings. It is thus important that the changeover be accomplished by means of operator working time as short as possible with a minimum of errors. Now this is not exactly the case in the installation described in the German patent cited above in which such operation is difficult to bring about by reason of the fact that the operator must locate, without making mistakes, the places in the magazine where a record carrier must be replaced. He must next effect such replacement which necessitates rendering accessible all the storage stations of all the magazines. Furthermore, the changeover operation necessitates in practice stopping the installation. This evidently is troublesome in a radio-broadcasting station, for example.

The same difficulties arise in a known intallation of the same type, even though specifically intended for handling reels of magnetic tapes for computer memories, which installation is described in the U.S. Pat. No. 3,920, 195. In this installation, there is provided only a single reading/recording station for magnetic tapes so that it is not possible therein to bring about the audio dissolve as is the case in the installation of the previously cited German patent. On the other hand, the replacement of the record carriers or magnetic tapes here is facilitated in the sense that the reels are filed in containers amalgamating together several tapes that one can thus replace all at once. If such configuration can be employed in computer memory libraries, the same cannot be said of an application for the restitution of audio recordings, in which often it is only wished to replace a single cassette (or compact disc) in a group of such record carriers. If, for example, in a container, a single one of such carriers must be replaced, it is necessary to remove the entire container from the machine, effect the replacement, then put the container back into place. As is well understood, during such operation, all the record carriers in the container concerned are unusable while it can happen that the programme to be broadcast includes precisely reading of all or part of one of such carriers. In order to avoid this, it is necessary then to coordinate the broadcasting programme with replacement of the carriers, which removes a large portion of the automatization possibilities from the installation. Furthermore, such known installation necessitates accessibility to all filing stations in the containers.

Similar drawbacks are found in a third installation known from the patent application EP 0 464 382, such installation being intended more specifically for reading compact discs.

The purpose of the invention is to furnish an installation of the general type indicated hereinabove, from which such drawbacks have been eliminated and which is, on the contrary, equipped in a manner such that the maintenance up to date of the stock of discs or record carriers may be readily accomplished without necessitating accessibility for the operator to the storage stations and without having to interrupt operation of the installation during replacement of the record carriers. Furthermore, such installation according to the invention can be entirely automated by means of a programmed control performed by a computer.

SUMMARY OF THE INVENTION

The invention has thus as objective an installation intended for recording onto and/or readout from audio, video, computerized and/or photographic, etc. information carriers such as magnetic tapes, audio or video discs, transparencies or the like, of the type comprising:

storage means forming a record library and exhibiting a plurality of storage locations, each intended to receive one of said information carriers;

at least one reading/recording arrangement for said carriers placed proximate said storage means;

transfer means for selectively transferring each of said record carriers to or from a storage location attributed thereto in said storage means towards said reading/
recording arrangement; and control means for controlling said transfer means;

such installation being characterized in that it also comprises:

temporary storage means for said record carriers which is movably assembled, preferably in a displaceable manner within said record library, whilst taking up a relatively reduced amount of space therein but in a manner so as to be capable of actuation by said transfer means to enable individual loading and/or unloading of said record carriers into and/or out of said record library.

Thank s to these characteristics, record carriers can be loaded into the installation according to the invention, or be replaced therein by small quantities in being stored in a temporary manner in the storage means provided to this effect. Since such temporary storage means are displaceable out of the library, a certain quantity of carriers can be prepared in advance for loading, then the temporary storage means can be put in the place in the library provided to this effect, then the automatic transfer of such carriers towards the places which are respectively attributed thereto within the library can be ordered up. Inversely, the temporary storage means, in being empty and placed in the library, can be filled with a certain number of carriers which must be removed from this latter.

During preparation of the temporary storage means for loading, the installation can thus continue to operate for reading and/or recording on the carriers. If such temporary storage means are displaceable, it will even be possible to accomplish such preparation outside the installation without its normal operation being thereby disturbed.

Another advantage of such characteristics according to the invention resides in the fact that an operator does not need to have access to the entire library in order to bring about changes of its content. Thus, the installation can be constructed in a manner such that the library as well as the reading and/or recording means are at all times sheltered from dust in a sealed container in which a trap door of small dimensions can be provided in order to place or remove therefrom the temporary storage means.

Other characteristics and advantages of the present invention will appear in the course of the description to follow, given solely by way of example and prepared having reference to the attached drawings.

BRIEF DESCRIPTION OF THE DRAWINGS

FIGS. 6 and 6A show a second variant of the record carrier manipulator which may equip the installation according to the invention, FIG. 6 showing the manipulator in the recovery position of a record carrier, and FIG. 6A showing it in the open position;

FIGS. 7, 7A, 8 and 9 show, through views in three orthogonal planes and to an enlarged scale, the details of the manipulator shown on FIGS. 4 and 5;

FIGS. 12, 13 and 14 show respectively by views in three orthogonal planes another embodiment of an input/output mechanism for the carriers;

FIG. 15 shows by an elevational view the details of one of the storage compartments for record carriers of the installation according to the invention;

FIG. 16 is a detailed view, to large scale and in horizontal cross-section taken along line XVI—XVI of FIG. 15, of a first variant of an arrangement for retaining the record carriers in their storage compartment;

DESCRIPTION OF THE PREFERRED EMBODIMENTS

Figure 1:
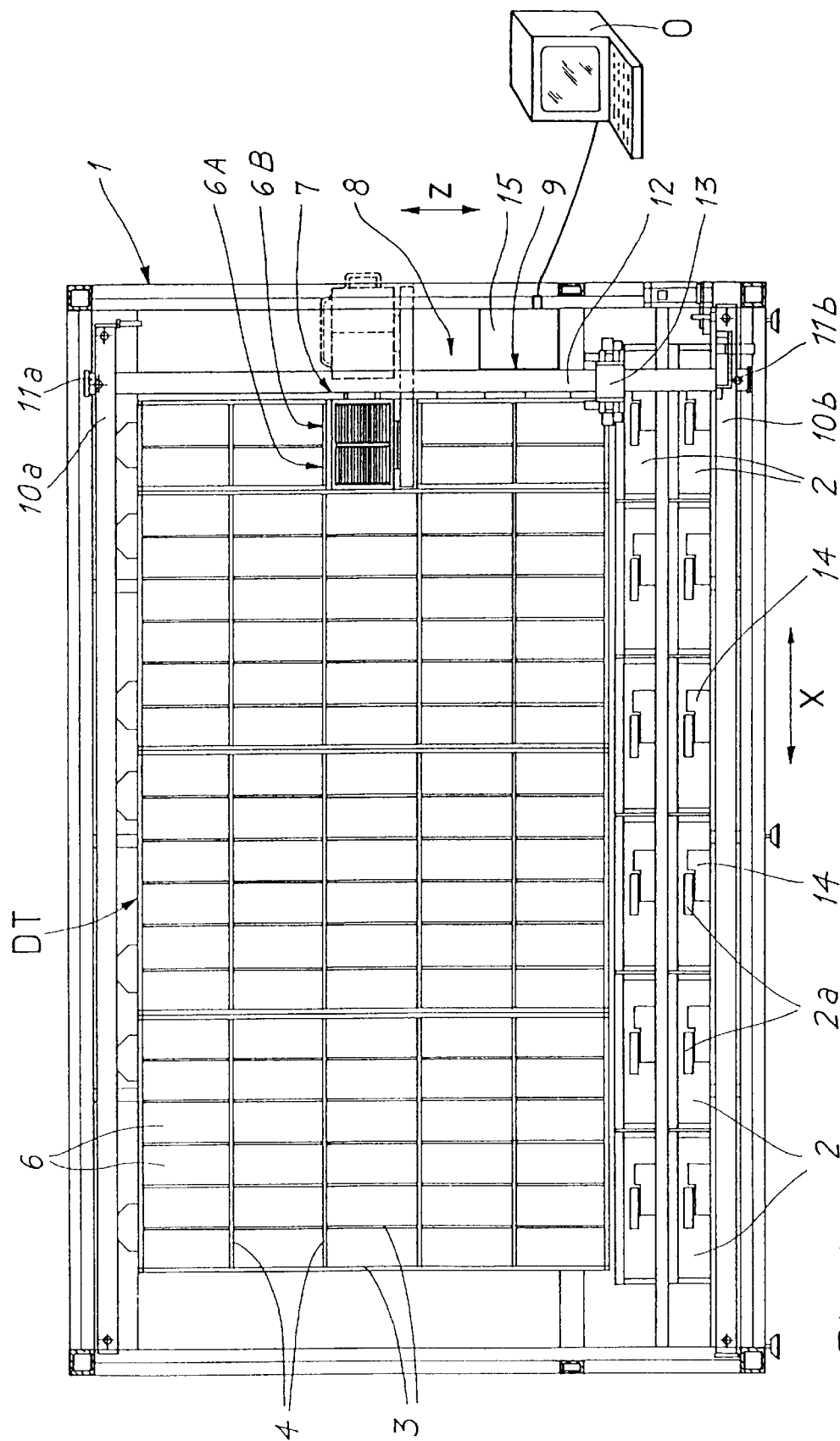
FIG. 1 shows an overall view in front elevation of the preferred embodiment of an installation according to the invention.
Figure 2:
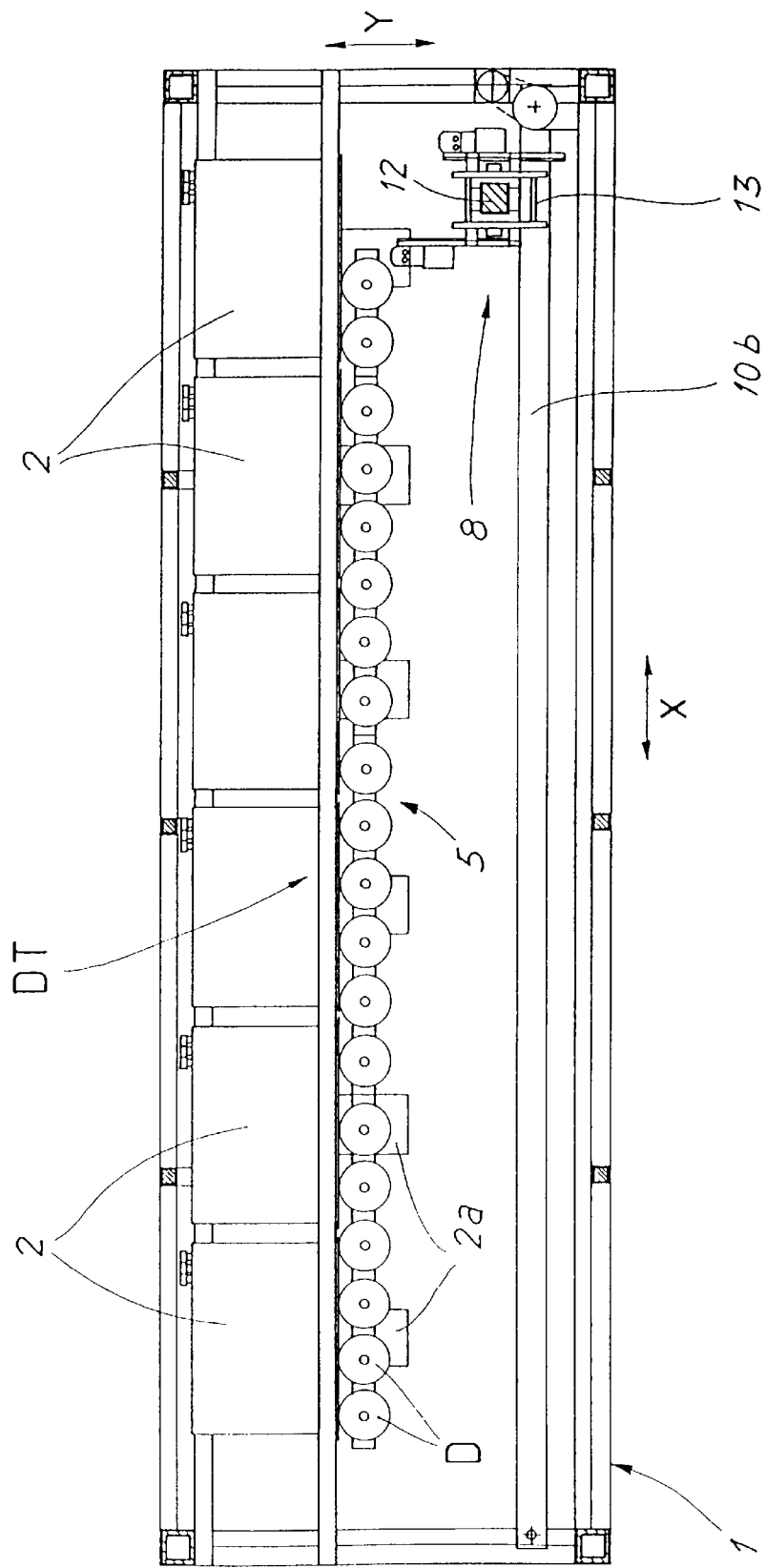
FIG. 2 is a general plan view of such installation.
Figure 3:
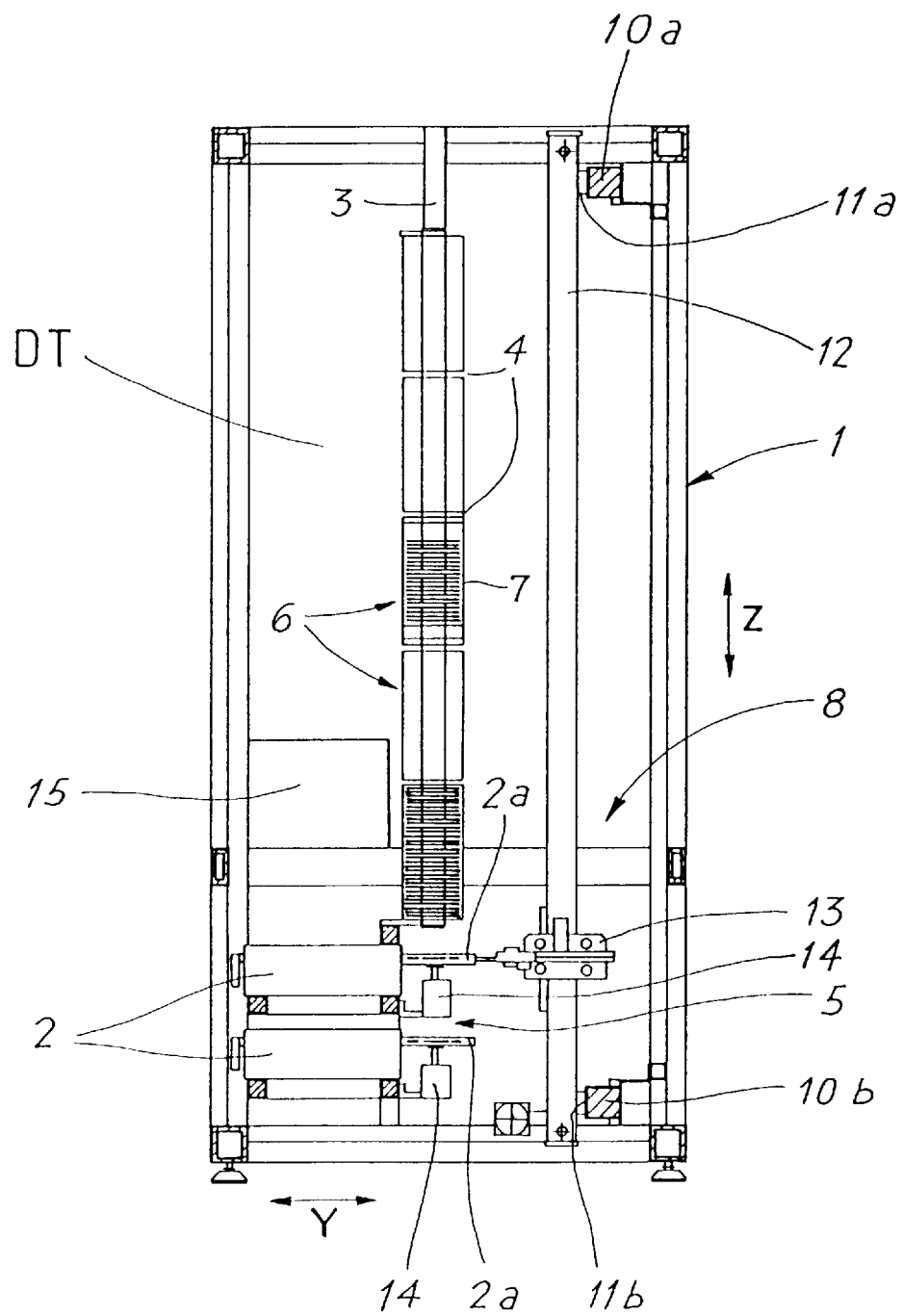
FIG. 3 is a side elevation view thereof.

Initially, reference will be had to FIGS. 1 to 3 which show the overall installation intended for the automatic recording and/or reading of information carriers such as magnetic tapes, audio or video discs, whether or not in compact form, and in a general manner every carrier capable of bearing recoverable information.

Such installation includes a framework 1 formed from metallic girders, for example of aluminium extrusions and intended to be set down on the floor. In order to establish the image and solely by way of example, in the embodiment shown on the figures, the installation can be conceived for a stock of compact discs (or library DT), of 6000 copies for example, the installation having in such case approximately the following dimensions: height 220 cm, width 341 cm and depth 133 cm. Outwardly, the framework 1 can be covered over with transparent walls provided eventually with access doors (not shown on the figures). However, under normal use, such access is not necessary for, as will be seen hereinafter, the installation can operate in an automatic manner while introduction of carriers or their removal can be accomplished through a small lateral opening measuring only 30×15 cm, for example. Thus, from the moment on of their introduction, the compact discs or other record carriers are at all times sheltered from dust.

In the lower portion of framework 1, cells are formed in which devices 2 enabling the use of the record carriers are arranged on several (two in the sample) superposed rows. In the present embodiment of the invention, such devices are readers for compact discs D (see in particular FIG. 2) which can be of every type available in commerce. For the present description it is important to note that each reader 2 is provided with an input/output drawer 2A as is well known (see also FIGS. 10 and 11 or 12 to 14, respectively).

It is evident in the case where the record carriers are of another type, magnetic cassettes for example, the devices 2 are chosen in consequence. In such case the installation enables not only readout, but also the write-in of recordings. In a general manner, the person skilled in the art will readily understand what will be, in this respect, the possible variants of the installation according to the invention, while remaining within the framework thereof.

It is also to be noted that the installation includes, preferably, more than one device 2 (whether they be solely for readout or for reading/writing) in a manner to be capable of assuring the operation with audio and/or possibly optical dissolve, by means of which two pieces can follow one another by fadeout of the first and increasing the power of the following. In the case shown, twelve compact disc readers 2 are provided.

Finally, it will be understood that the invention is not limited to the record carriers, briefly suggested hereinabove. To the contrary, it could also be applied to the reading of photographic carriers, for example transparencies, films, etc.

A network of risers 3 and cross-members 4 is mounted above a zone 5 in which open out drawers 2a of readers 2 (see in particular FIG. 3). Such network which constitutes the actual library DT of the apparatus bounds a certain number of storage compartments 6 of compact discs D, each compartment being able to hold sixty discs, for example. FIG. 1 shows that two of such compartments 6A and 6B located in the example at mid-height and to the right of the network 3, 4, are intended to house a loading/unloading cassette 7 the details of the latter as well as its specific assembly in the installation being described hereinafter with reference to FIGS. 21, 22 and 23.

The installation also comprises a transfer arrangement 8 for the record carriers enabling transfer of any carrier whatsoever from the library DT towards any reader whatsoever and back in order to be read therein and also to transfer any carrier whatsoever filed in cassette 7 towards any location in the library DT and back, this for the purpose of effec ting loading and u nloading of the carriers.

The t ransfer arrangement 8 includes initially a transporter X-Z 9 comprising an upper horizontal rail 10a, on which may be displaced an upper carriage 11a, a lower horizontal rail 10b on which may be displaced a lower horizontal carriage 11b, a vertical bar 12 fixed onto the upper and lower carriages 11a and 11b so as to be displaceable in horizontal translation (axis X) and finally a disc grasping carriage 13 movably mounted on the vertical bar 12 (axis z).

The transfer arrangement also includes, and this for each reader 2, an input/output mechanism 14 (visible on FIG. 3) intended to deposit a disc in drawer 2a of the latter or to remove it therefrom.

Each carriage 11a, 11b and 13 is displaced on its associated rail (respectively its vertical bar) by means of known translation mechanisms with chains or tapes incorporated in such rails and such bar. Mechanisms of this type being well known to specialists, a detailed description thereof will not be given herein. An appropriate mechanism can be found commercialized by the company MHM, A-6630 Kufstein, Austria, under reference L01Z. In the same manner, the control of the carriage movements is brought about by means of a control unit housed in a case 15 fixed to framework 1 (to the right of the latter as seen on FIG. 1), such unit cooperating advantageously with a programmed microcomputer O in order to determine the order of reading of recordings, the loading and the unloading of discs, etc.

Figure 4:
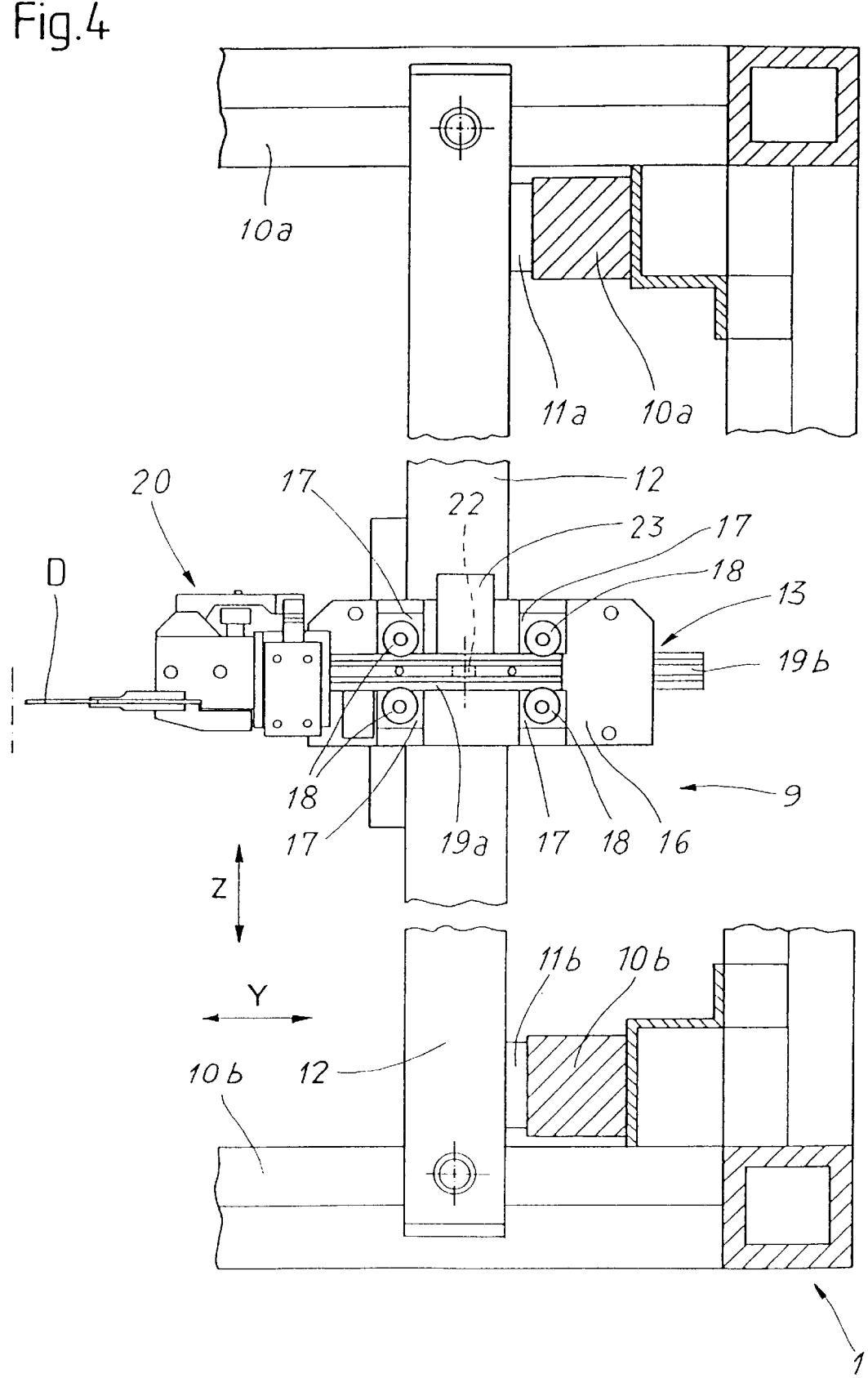
FIG. 4 is a partial cross-section view to a larger scale than that of FIGS. 1, 2 and 3 of a first variant of the record carrier manipulator, mounted to be vertically movable on a column, itself mounted to be horizontally movable, the manipulator being shown in its position of recovery of a record carrier.
Figure 5:
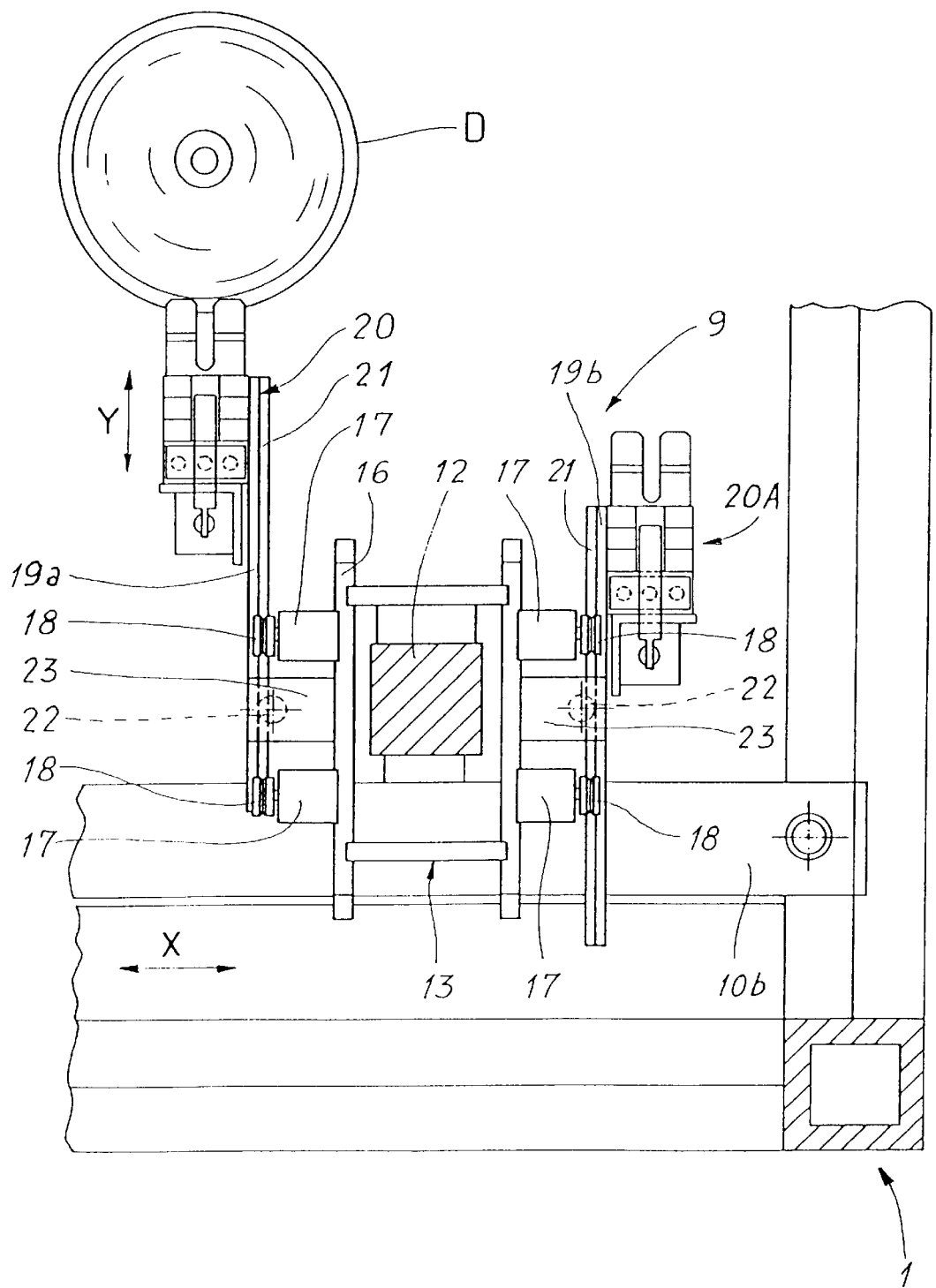
FIG. 5 is a plan view partially in cross-section of the horizontally movable column fitted out with two manipulators according to FIG. 4.

Reference will now be had to FIGS. 4 and 5 which show respectively a vertical and a horizontal cross-sectional view of transporter 9.

Carriage 13 includes a frame 16 surrounding the vertical bar 12 and movably mounted thereon. On each side of such frame are provided two mountings 17 which bear sets of roller wheels 18 for respective arms 19a, 19b the latter intended to bear a grasping clamp 20. The arm 19a or 19b is movably mounted longitudinally along axis Y between the respective sets of roller wheels 18. Each arm 19a, 19b bears a rack 21 with which meshes an output pinion 22 from a driving motor 23. Such motor 23 enables displacement of the associated clamp in the direction of axis Y.

FIGS. 7, 7A, 8 and 9 show the details of the preferred embodiment of the grasping clamp 20. The support block 24 is secured on arms 19a, 19b. Such block bears at the rear an angle iron 25 to which is secured an electromagnet 26. A lever 27 is pivotally mounted in a yoke 28 which is formed on the upper portion of block 24. Such lever is connected to the core of the electromagnet 26 in a manner such as to be able to swing upwardly when the electromagnet is energized. Three cylindrical holes 29a, 29b and 30 the intermediate hole 30 of which is blind, are pierced in block 24.

The exterior holes 29a and 29b traverse block 24 from end to end and receive cylindrical rods 31 and 32 connected above by screws on the one hand to a transversal bar 33 and below on the other hand to the movable jaw 34 of the grasping clamp 20. The other jaw 35 of such clamp is fixed in block 24. An adjustment screw 36 is screwed into lever 27 and bears on transversal bar 33. It is intended to adjust the grasping force of the clamp.

Figure 7A:
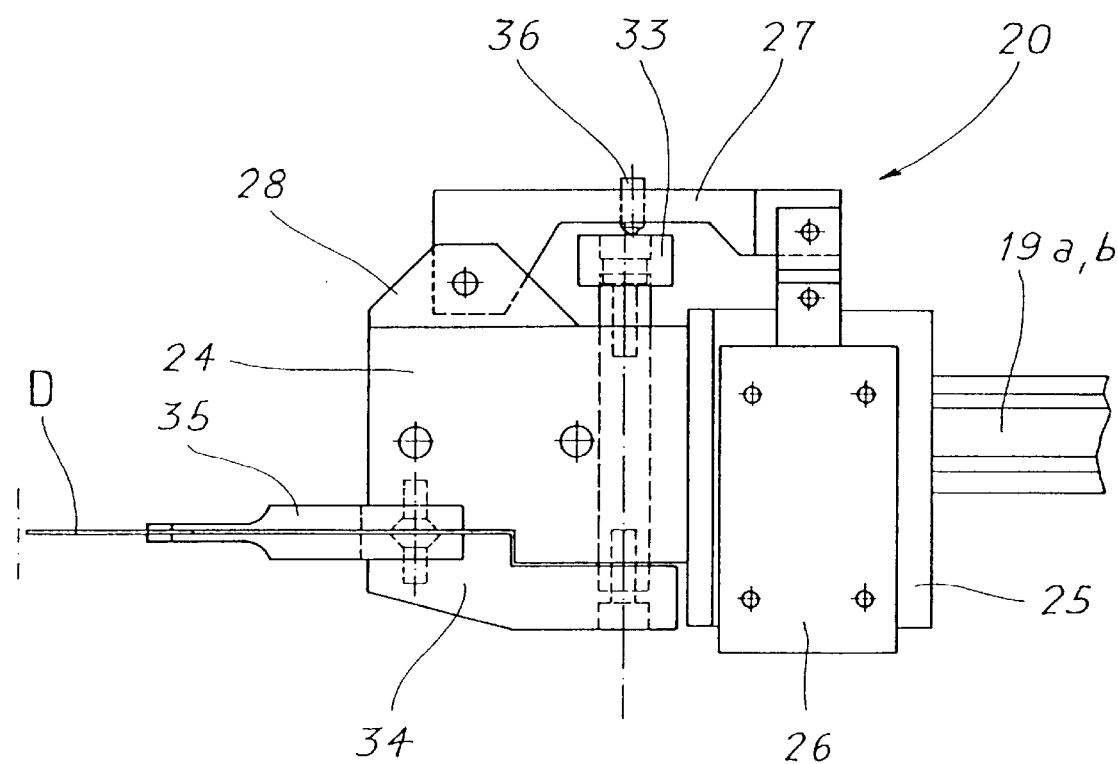

A return spring 37 is engaged in the blind hole 30 and thanks to its bearing on lever 27, it urges clamp 20 to be closed when the electromagnet 26 is not energized (FIG. 7A). In the other case, energization of the electromagnet 26 provokes downward pivoting of lever 27, the descent of the group formed by stems 31 and 32, bar 33 and jaw 34 against the action of spring 37 and, following thereon, opening of clamp 20.

Reference will now be had to FIGS. 6 and 6A which show another embodiment of the transporter 9 differing from the transporter of FIGS. 4 and 5, by the form of the grasping clamps. The latter here bear references 20' and 20' A and each comprises a mounting block 38 secured to the end of arm 19a or 19b and in which is formed a fixed jaw 39. The arms 19a, 19b also bear an electromagnet 40 which controls the displacement in the direction of axis Y of a slider 41 bearing a pusher 42 in the form of a wedge. A movable jaw 43 mounted to slide vertically on block 38 bears a bail 44 the lower horizontal bar of which cooperates with the oblique slope of pusher 42.

Normally, such pusher 42 is elastically urged towards the rear in the direction of the electromagnet 40 while when the latter is energized, pusher 42 is displaced forwardly and pushes the mobile jaw 43 downwards thanks to bail 44 in contact with the slope of the pusher.

Figures 10, 11:
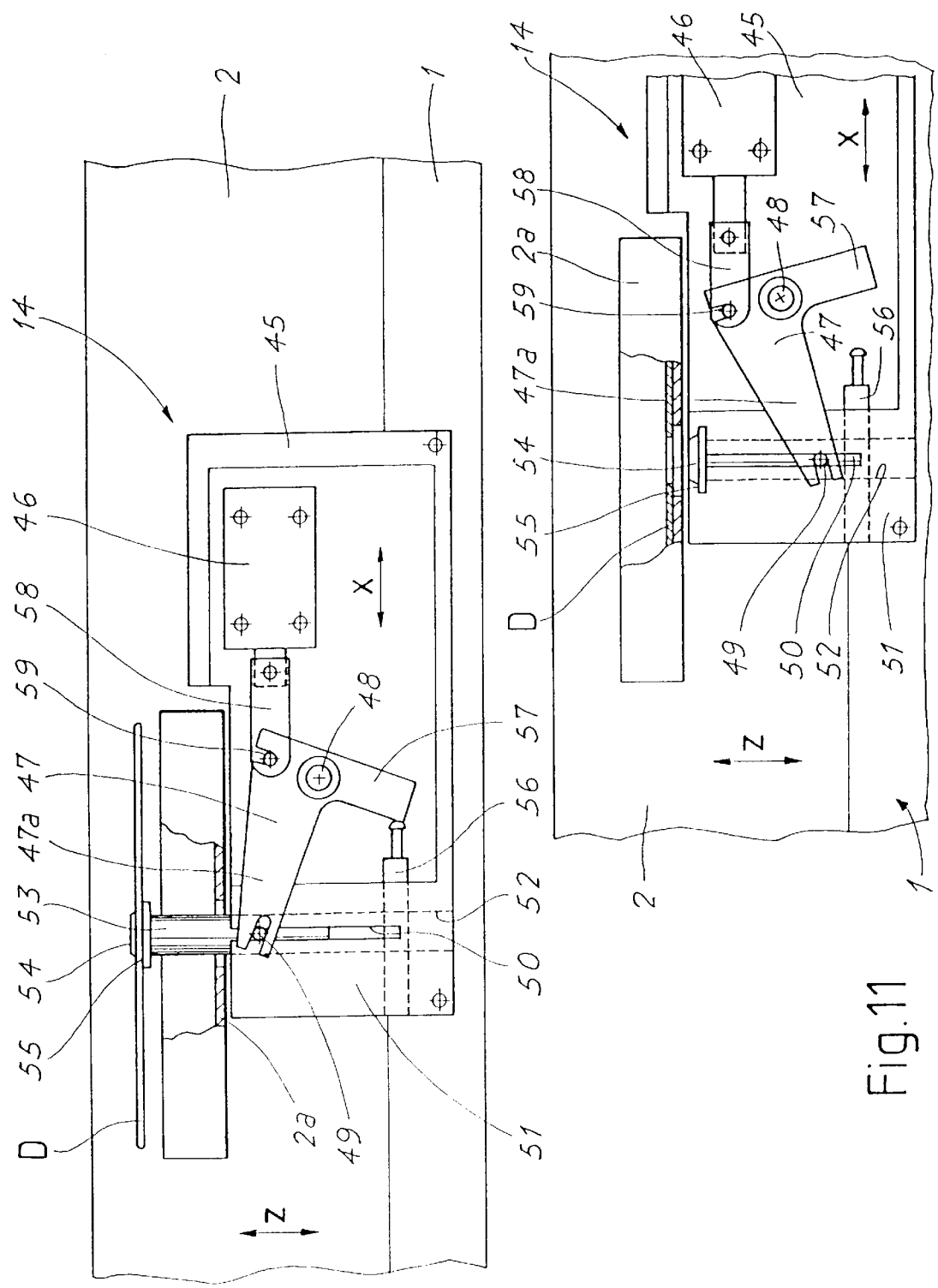
FIG. 10 shows a front elevation view, to a large scale, of a first variant of an input/output mechanism for transferring the record carriers from the manipulator towards and from a reader of such carriers, such mechanism being shown in a first active position.
FIG. 11 shows the input/output mechanism of FIG. 10 in a second rest position.

Reference will now be had to FIGS. 10 and 11 in order to describe the preferred embodiment of the input/output mechanism 14.

Such mechanism includes a mounting plate 45 fixed onto framework 1 and bearing an electromagnet 46. An L-shaped lever 47 is pivoted onto such mounting plate around a spindle 48 which is fixed and the axis of which extends in the direction of axis Y.

One of the arms 47a of lever 47 is forked at its end and is fitted around a horizontal pin 49 which traverses a vertical slot 50 formed in a guide block 51 fixed to the mounting plate 45. Such block is fixed onto plate 45 and is traversed by a cylindrical hole 52 in which is received an operating stem 53. Such stem bears at its upper end a button 54 adapted to be adjusted into the central opening of a compact disc D and comprising a shoulder 55 on which the latter may be brought to rest.

The vertical slot 50 communicates over its entire height with the cylindrical hole 52, while pin 49 is force fitted into stem 53. In this manner rotation of lever 47 around its axis displaces stem 53 vertically.

A damper 56 is secured in the guide block 52 and cooperates with the second arm 57 of lever 47. The latter is coupled to the core of the electromagnet 45 by means of a coupling link 58 and a spindle 59 implanted across lever 47.

On FIG. 10, the grasping clamp 20 or 20a has just brought a compact disc D above the drawer 2a of a reader 2, such drawer having been previously opened. The electromagnet 46 is energized and lever 47 turns in the clockwise sense in order to lift stem 53 and bring button 55 below disc D. Such motion of the stem is damped by damper 56 in order not to risk ejection of the disc from the grasping clamp 20 or 20a. As soon as disc D is taken up by stem 53, the electromagnet 45 is de-energized, which brings the stem with the disc downwardly, by the simple action of gravity. Disc D is then gently deposited in drawer 2a (FIG. 11) and stem 53 is retracted below such drawer which may thus be closed in placing disc D into the reader for reading its recording. The operation of discharging proceeds exactly in the opposite sense.

Figure 14:
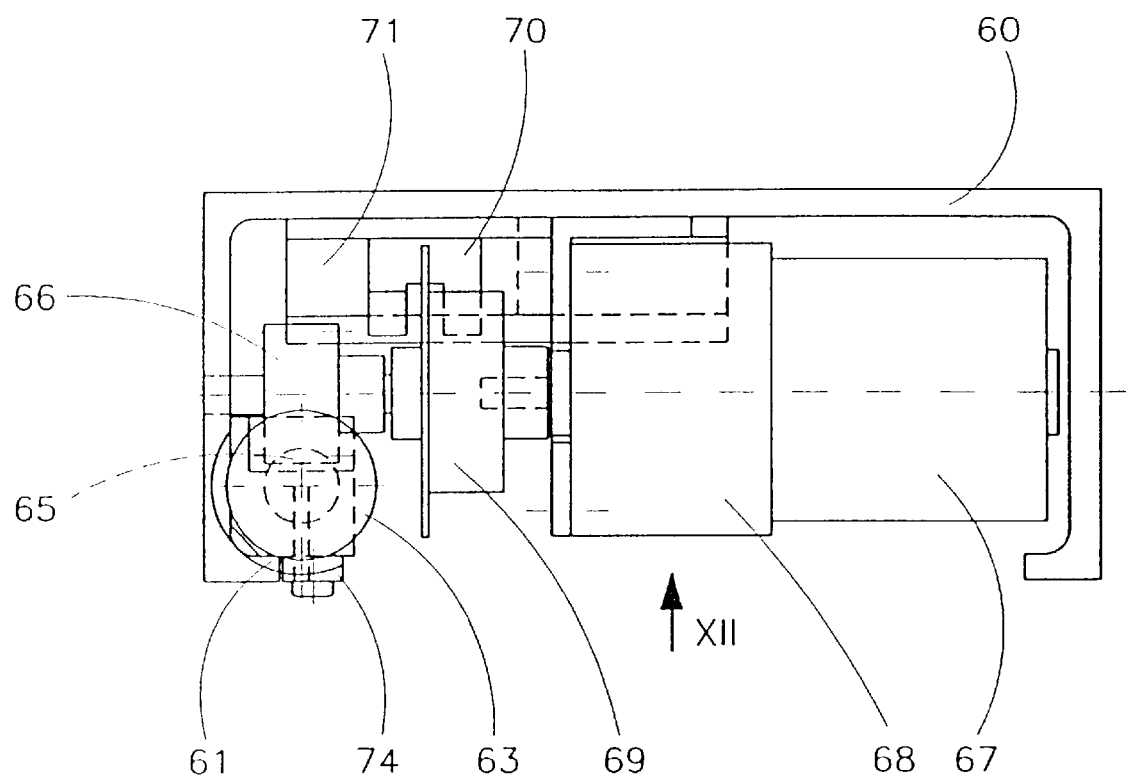

Reference will now be had to FIGS. 12 to 14 which show another embodiment of the transfer mechanism for the record carriers.

Such mechanism comprises a mounting 60 secured onto framework 1 and exhibiting the form of a U the center and the arms of which extend vertically (see FIG. 12). Mounting 60 carries a guide 61 provided with a passage 62 of circular cross-section and a vertical axis G—G. A stem 63 fitted into passage 62 may slide vertically in the latter. It bears at its upper end a support button 64 for compact discs. A rack 65 extending vertically is machined on stem 63 and meshes with a pinion 66 mounted for rotation in the mounting 60. Such pinion 66 is coupled to a driving motor 67 through a speed reducer 68 and a friction clutch 69. A photo-electric detector 70 is intended to detect the position of stem 63 and is also secured in mounting 60. It is electrically connected to case 15 (FIG. 1) which transmits appropriate information to the micro-processor O (FIG. 1). The electric driving motor 67 is connected in the same manner to case 15.

A positioning pin 72 fastened into stem 63 slides in a slot 73 formed in guide 62. Such pin 72 cooperates with an adjustable abutment 74 intended to limit the upward course of stem 63.

Reference will now be had to FIGS. 15 and 16 which show by a first variant according to the invention how compact discs D can be maintained in their compartment 6 of the library DT.

Each compartment 6 is bounded by risers 3 and cross-beams 4, the width of which, that is to say, the dimension in the sense of axis Y, is clearly less than the diameter of discs D (see FIG. 16). Combs 80, machined for example in blades of plastic, are fixed onto the lateral walls of each compartment 6. Each facing pair of teeth 81 of the combs 80 of each compartment 6 thus defines a filing location for a compact disc D. In the faces of the combs turned towards risers 3 are formed two parallel grooves 82 in which are arranged cords 83 of an elastic material. The grooves 82 have a depth such that they cut off teeth 81 slightly. In this manner, cords 83 which have a diameter equal to the depth of the grooves project slightly over the bottom of teeth 81. For the rest, the width of compartment 6 is such that the distance between the bottom of facing teeth 81 on the lateral walls of such same compartment 6 corresponds to the diameter of the compact discs D. There results therefrom by means of a simple assembly an effective jamming of the discs in the compartments, their putting into place or disengagement from their respective locations requiring only a minimum of force by the grasping clamp 20 or 20A. Effectively, such operation requires only a slight deformation of the cords located at the insertion or withdrawal side of the disc which, once in place, is maintained therein by two small portions of its periphery retained by cords 83.

Figure 17:
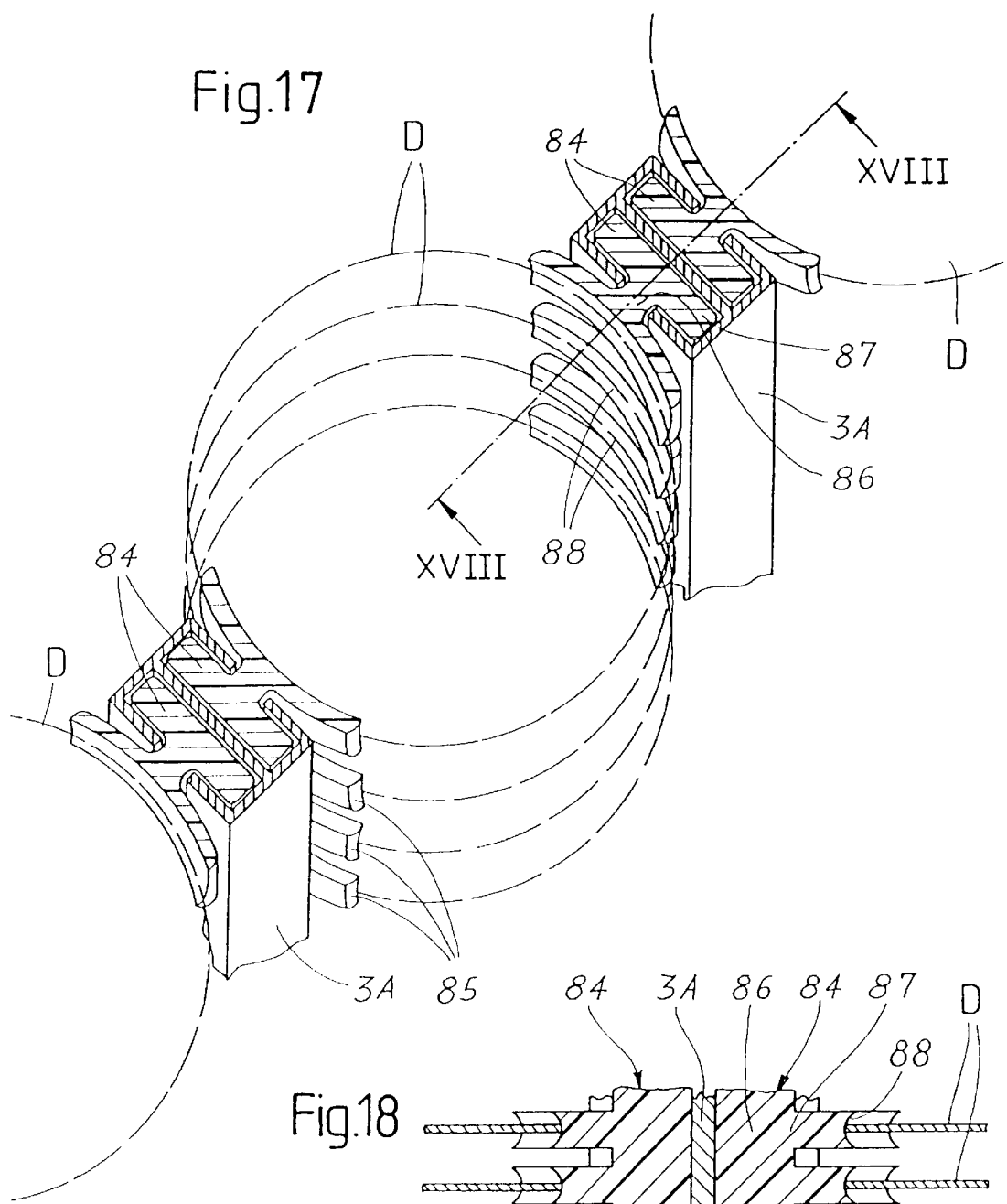
FIG. 17 shows a perspective view to large scale of a second variant of the arrangement for retaining the record carriers in their storage compartment.
Figure 18:
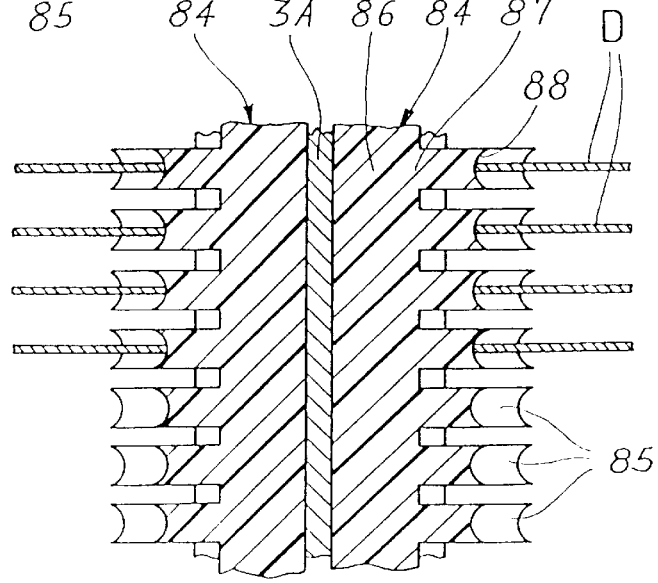
FIG. 18 is a vertical cross-section taken along line XVIII—XVIII of FIG. 17.

FIGS. 17 and 18 show another variant of an arrangement for the maintaining of compact discs in their compartments 6. In this case, each riser 3A of the library DT is provided in the form of a double extrusion in C form in the longitudinal spaces of which are inserted combs 84 formed in a single piece by rubber moulding, for example. Each tooth 85 of such a comb includes a root 86 which. is connected to a base 87 inserted in the corresponding portion of the double extrusion 3A. Additionally, each tooth 85 has a curved form in the horizontal plane and its face 88 turned towards the exterior is slightly concave. In this manner, discs D can be retained as well horizontally as vertically and be put in place and withdrawn by a slight elastic deformation of teeth 85, without requiring here again a substantial effort by the grasping clamp 20 or 20A.

Figure 19:
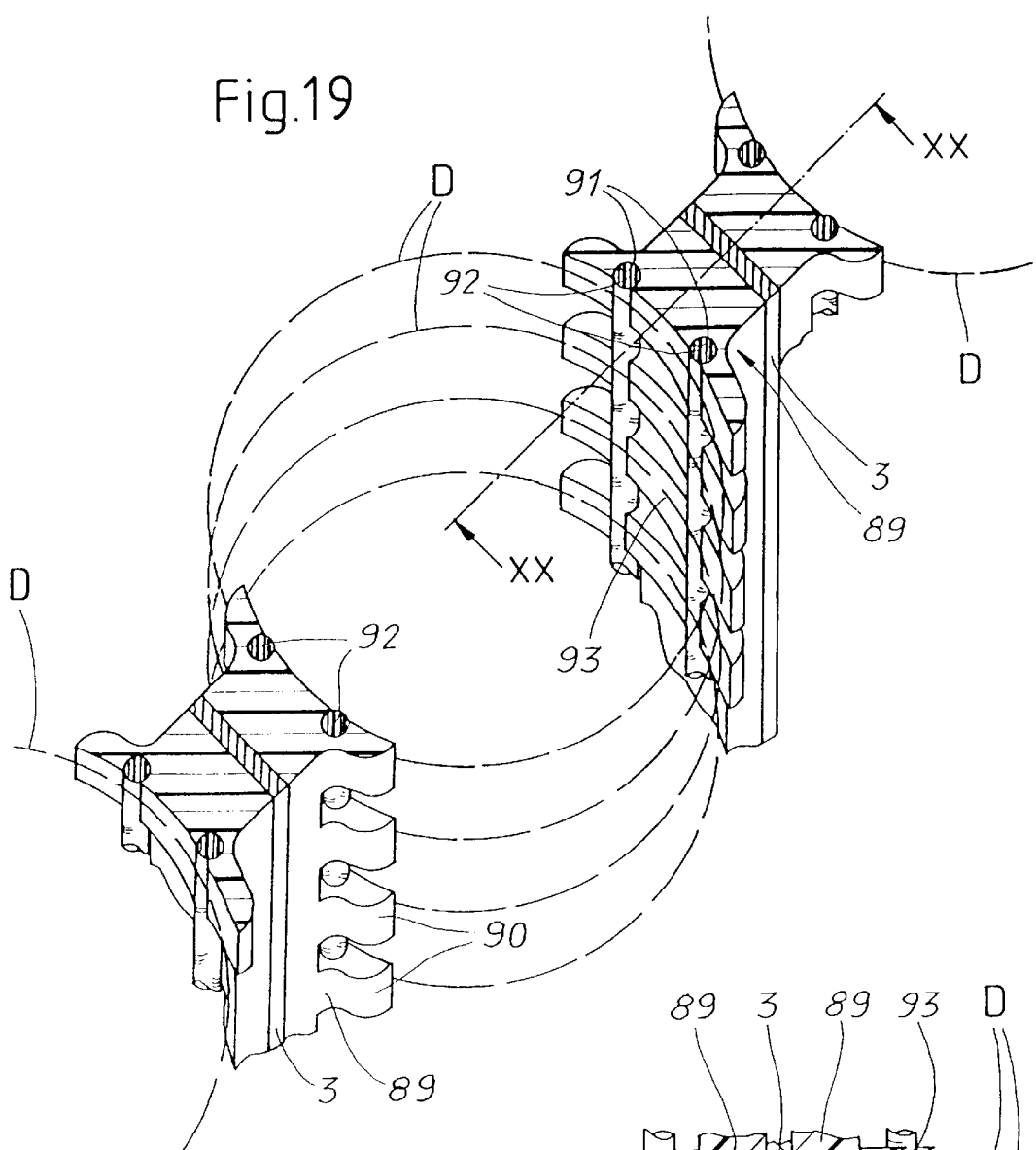
FIG. 19 shows, by a perspective view, a third variant of the arrangement for retaining the record carriers in their storage compartment.
Figure 20:
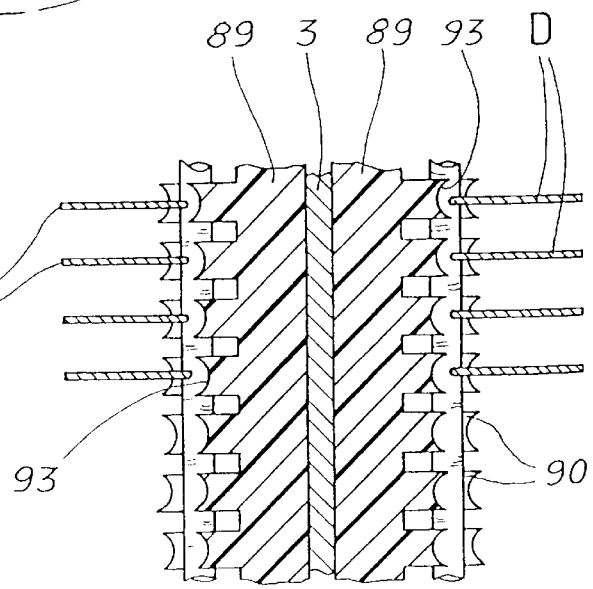
FIG. 20 is an enlarged vertical cross-section view taken along line XX—XX of FIG. 19.

FIGS. 19 and 20 show another variant of an arrangement for maintaining the discs in the library DT.

In this case, the risers 3 are found to be formed as simple plates, while the extrusions 89, of moulded plastic for example, are fixed to such plates, for example by gluing. The extrusions 89 also take the form of a comb, the teeth 90 of which are slightly arched in the horizontal plane. Each comb 89 exhibits two longitudinal grooves 91 in which are respectively maintained two cords 92 of elastic material and projecting out slightly from the outer face 93 of teeth 90. Furthermore, such face of each tooth is concave.

This arrangement, as in the two preceding cases, enables suitable maintenance in place of compact discs without much stressing of the grasping clamp 20 or 20A during operations of putting into place or withdrawal.

Figure 21:
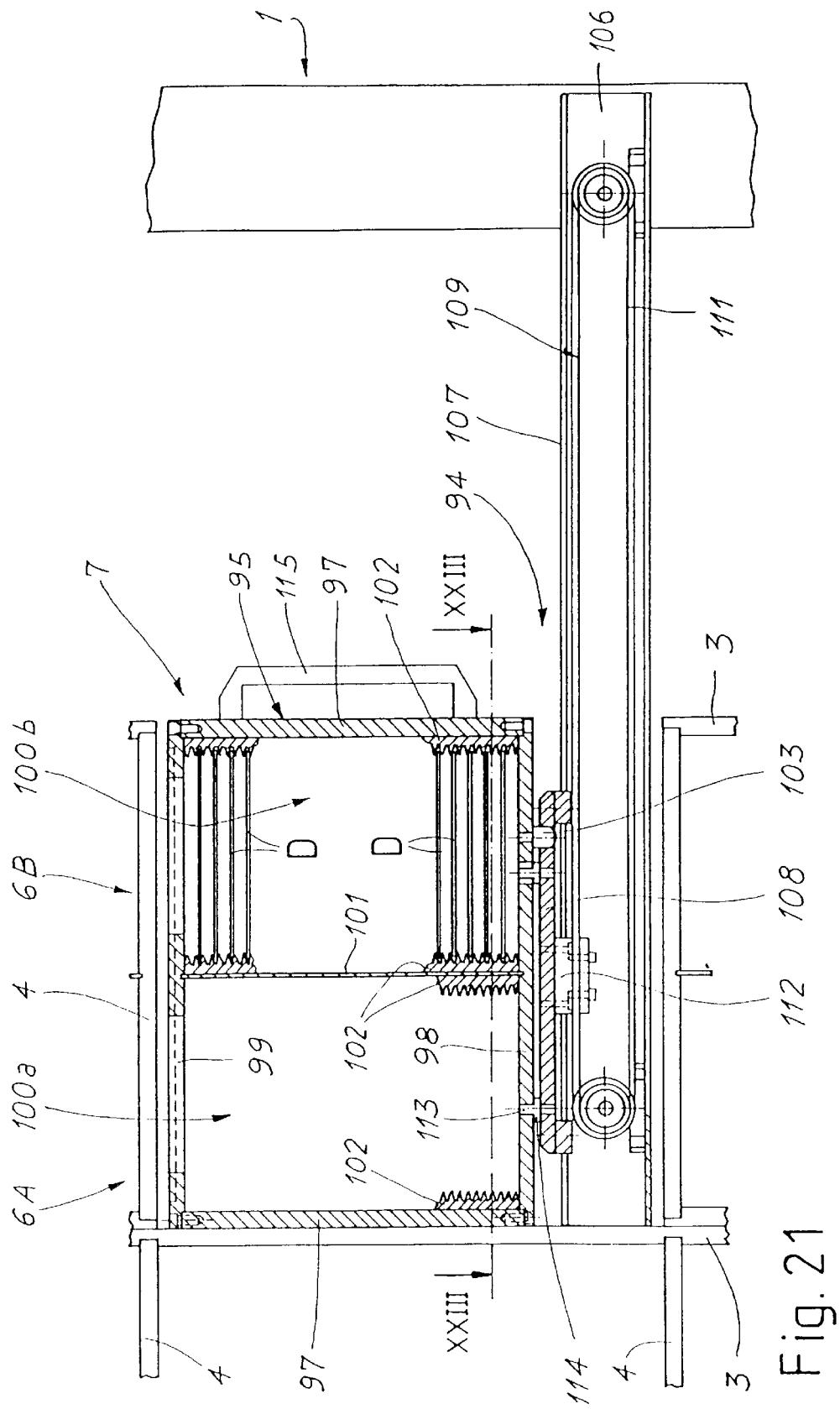
FIG. 21 is a front elevation view of the loading/unloading cassette of the installation according to the invention, as well as its translation mechanism.
Figure 22:
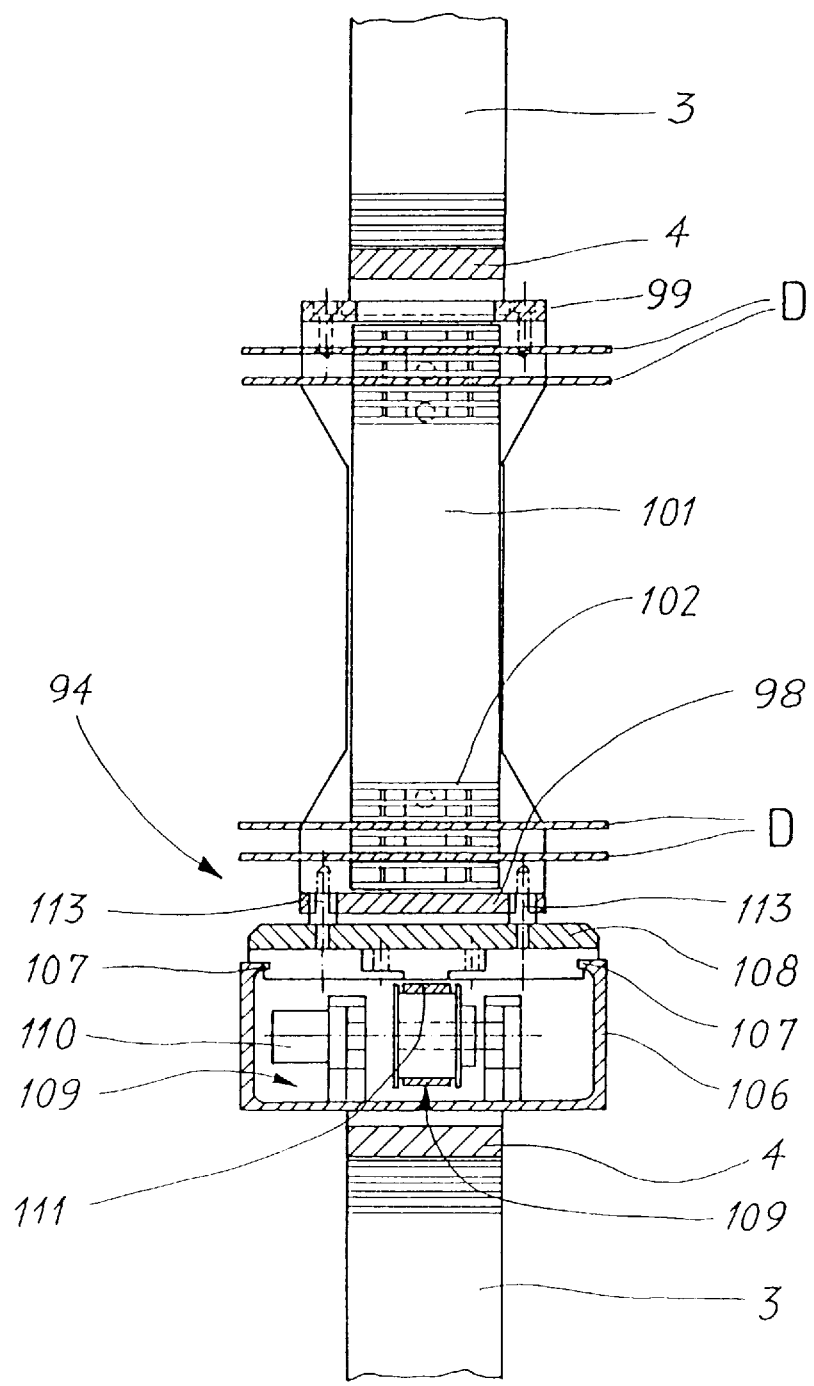
FIG. 22 shows a lateral view, partially in cross-section, of the cassette and its displacement mechanism.
Figure 23:
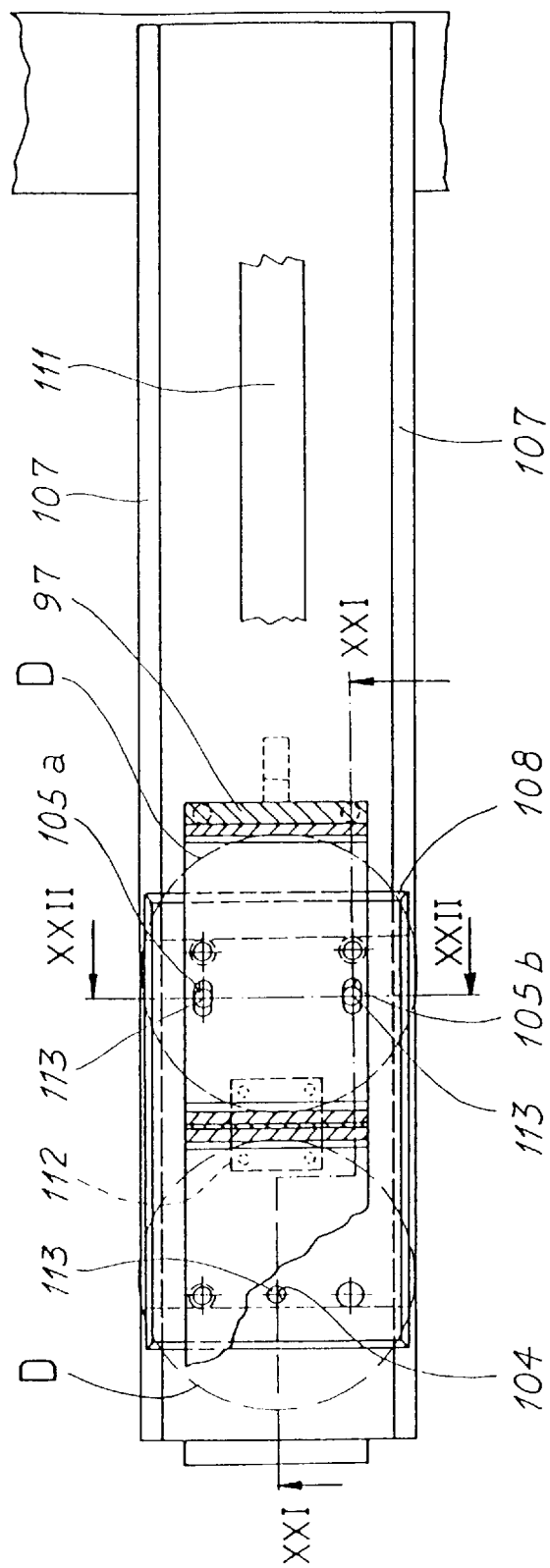
FIG. 23 is a horizontal cross-section according to line XXIII—XXIII of FIG. 21.

FIGS. 21, 22 and 23 show the preferred embodiment of the loading/unloading cassette 7 of the installation according to the invention. It will be recalled that such cassette is placed in two special compartments 6A and 6B of the network of the installation forming the library DT (see FIG. 1).

Cassette 7 is associated with a handling mechanism 94 intended to facilitate the placing thereof into the installation and the withdrawal from the latter.

The actual cassette 7 includes a frame 95 formed of two risers 97, a bottom 98 and an upper plate 99. Such frame is divided into two compartments 100a and 100b by a separation wall 101. The latter and the internal faces of risers 97 are furnished with combs 102 which can be formed in conformity with the variants thereof which have been described hereinabove with reference to FIGS. 15 to 20 respectively.

Bottom 98 exhibits four threaded holes into which are screwed feet 103 for posing cassette 7 on any surface whatsoever, that of a table for example, in order to enable the furnishing thereof with discs D or to remove the latter therefrom when outside the enclosure of the installation.

Bottom 98 also exhibits three positioning holes 104 and 105a, 105b one of which, 104, is circular and the other two 105a and 105b are oblong.

A rail 106 having a U-formed profile is mounted in compartments 6A and 6B in the direction of the X axis. Such rail extends up to a riser of framework 1; in the example described here from the right side of the installation, and is secured to such riser as shown on FIGS. 1 and 21.

The flanks of rail 106 are curved back towards the interior in order to form two slideways 107 on which is fitted a pallet 108 mounted on rail 106 to be movable in the direction of the X axis. A transport mechanism 109 is mounted in rail 106. It includes a driving motor 110 coupled to an endless belt 111 which extends over practically the entire length of rail 106. Pallet 108 is secured to belt 111 by a mounting 112.

Positioning studs 113 are screwed into pallet 108 and are intended to be fitted into the respective positioning holes 104 and 105a, 105b. Each stud is provided with a radial shoulder 114 in order to maintain a slight space between pallet 108 and cassette 7, when the latter is placed into the installation.

A lateral handle 115 and possibly a retractable handle (not shown) provided on the upper plate 99 enable the assurance of easy handling of cassette 7.

Thanks to this arrangement, cassette 7 can be displaced towards the right at the demand of the operator from its working position (shown on FIGS. 21 and 23) towards a position in which the operator can remove it from the installation and possibly replace it by another cassette identical to that which has just been removed.

The operator can then remove the discs D contained in the cassette, that is to say, those which are no longer to form part of the library DT, and replace them with new discs which are to form part thereof in the cassette. It is understood that during this time the installation itself can continue to operate normally on the basic stock of discs contained in the library DT. It can be advantageous to add to the installation several cassettes 7 so as to be able to prepare loadings in advance. All such cassettes can then be inserted one after the other in the compartments 6A and 6B of the installation in order that the transfer of discs D to or from the library DT can take place. It is thus determined that the installation gives the operator great flexibility of use and of loading/unloading of the discs.

It is also understood that transporter 9 can be used not only to assure transfers between the readers 2 and the library DT and back, but also to assure those which are to take place back and forth between library DT and cassette 7 in place in compartments 6A and 6B, the transporter functioning in this latter case exactly according to the same principle as in the first case.

As already indicated hereinabove, the installation can be controlled by a computer O suitably programmed for maintaining up to date a catalogue of discs of the library DT, with all the data relative to such discs. It is known that compact discs have an identification number which can be stored in the computer accompanied by the location coordinates which the disc has in the library DT. The circuits contained in the electronic case 15 are conceived so as to be able to control the motor means of the transporter 9 in a manner such that the grasping clamps 19a and 19b can be positioned in front of every location of the library DT or every reader 2 and there accomplish the loading and unloading work. It is the same for every location of cassette 7. The components such as the driving motors, limit switches, brakes, electromagnets and the like as well as the interface and control circuits contained in the case 15 which are necessary for executing the tasks of keeping the library DT up to date can be provided without difficulty by specialists as can moreover the software be conceived on which the control computer O must operate.

Figure 24:
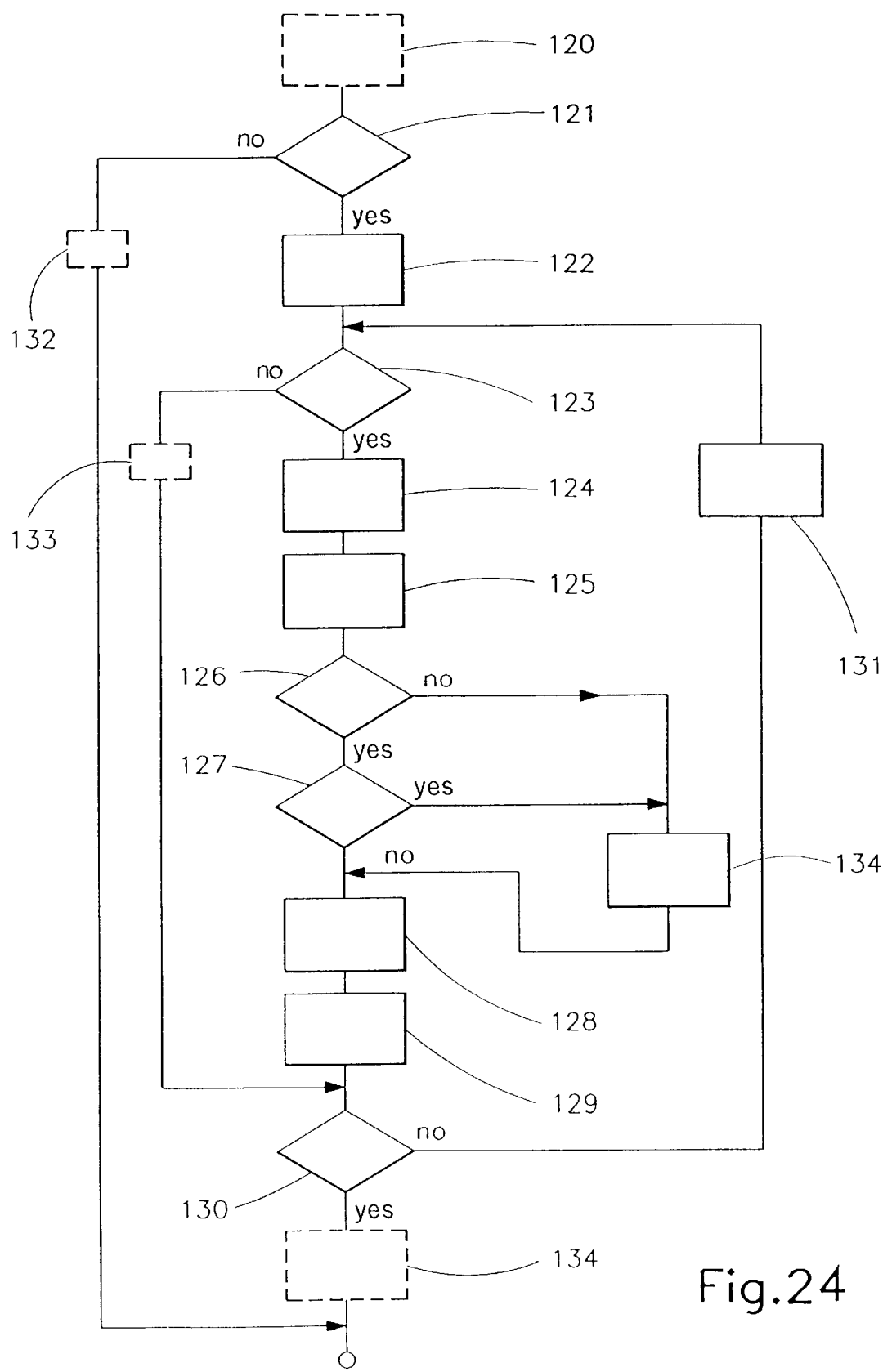
FIGS. 24 and 25 are simplified flow charts illustrating the operation of the loading/unloading of the installation according to the invention.
Figure 25:
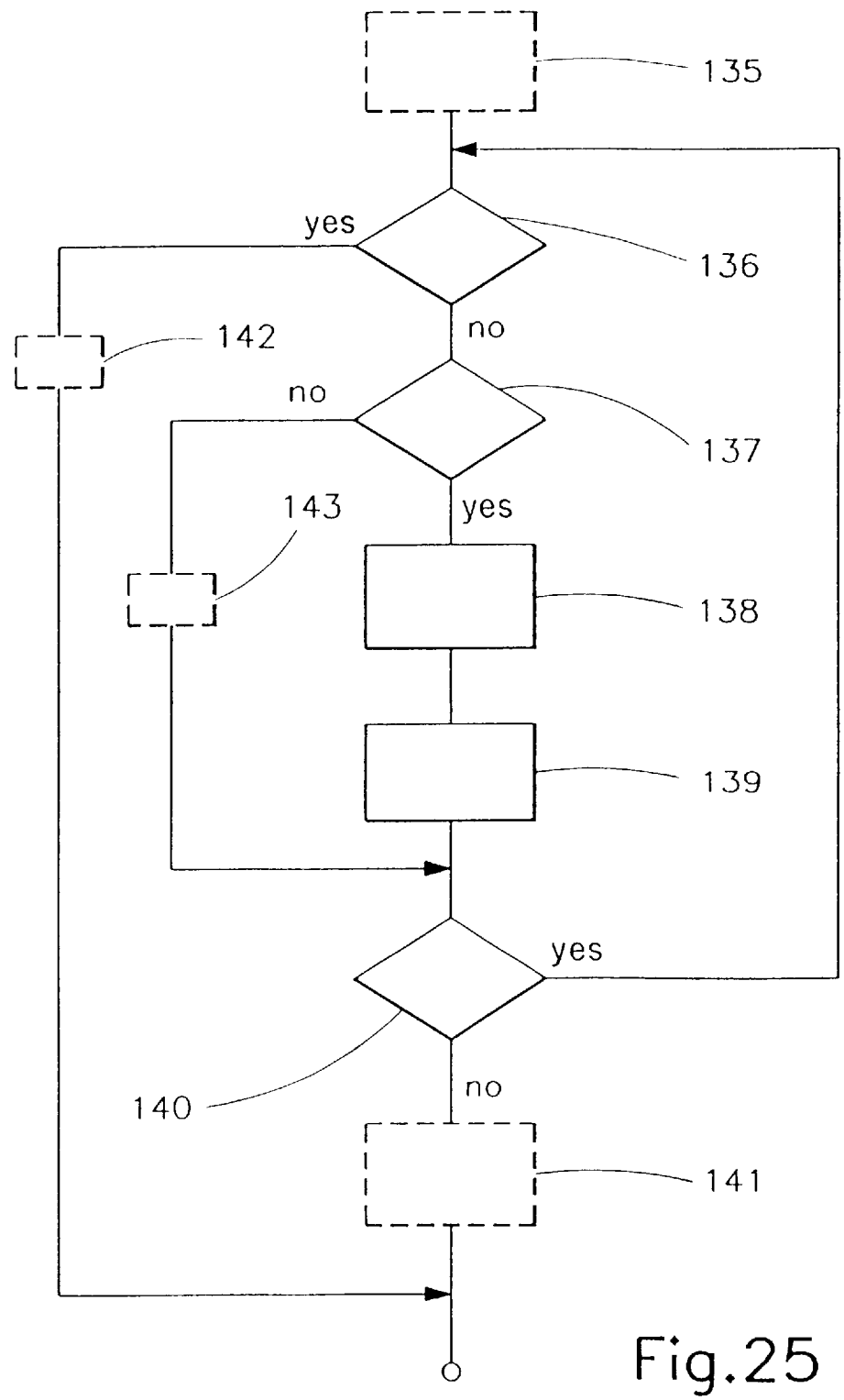

FIGS. 24 and 25 show a flow chart on the base of which a portion of this software can be written.

FIG. 24 delineates the loading procedure of discs D into library DT.

Prior to withdrawing cassette 7 located at the moment under consideration within the installation, the operator will have taken care, with the help of an appropriate programme stored in the control computer O, to load such cassette with discs D which are no longer necessary in the library DT.

It is supposed that library DT is still entirely empty and that all the locations must be provided with a copy. The operator loads an empty cassette 7 with discs, which operation is performed outside the installation. He introduces the references of the discs and other useful information concerning them into the computer O (operation 120, FIG. 24).

The cassette thus loaded is placed on the pallet 108 which previously has been brought into its proper position (right hand position on FIGS. 1 and 21). The operator actuates motor 110 which puts cassette 7 back into its loading position for library DT.

A computer O holds the state of each location of library DT constantly in its memory, where necessary completed by the coordinates of disc D which is filed at this location. In the example described, the memory still contains no data relative to the discs.

The programme thus interrogates the memory of the computer in order to know whether a place is free. In the present case (operation 121) the answer is affirmative and the transfer arrangement 8 is controlled such that a grasping clamp 20 or 20A goes to look for the first disc D in a location of cassette 7 designated by the computer according to the list established in 120 (operation 122).

As already indicated hereinabove and in a known manner, the installation is provided with various elements such as limit switches, photoelectric arrangements and other like elements permitting the computer O to be informed at every instant as to the state of the movable elements of the installation such as the transfer arrangement 8, opening or closing of the grasping clamps 20 or 20A, the state of the lifting mechanisms 14, the position of the drawers of readers 2, etc., the signals coming from such elements being applied to computer O through interfaces, all of which communicate with the interface located in case 15.

Thus, during operation 123 (FIG. 24), the computer O can determine, with the help of a grasping clamp 20 or 20A of the transfer arrangement 8, whether a compact disc D is present in the first location of the cassette 7.

If the response is affirmative, the grasping clamp 20 takes the corresponding disc D and the transporter 9 brings it above an input/output mechanism 14 belonging to one of the readers 2. Such mechanism 14 places the disc in drawer 2a of such reader, then open (operation 124). The drawer is closed and the catalogue number of the disc is read and transferred to computer O (operation 125). Upon termination of such reading (operation 126), the computer O verifies whether the catalogue number is or is not already present in its memory (operation 127).

The operation 130 consists in verifying whether the end of the list of cassette 7 (established by operation 120) has been reached. If not, the operations are taken up again by grasping a new disc in cassette 7 (operation 131) and thus following until the cassette is entirely empty.

In the meantime, the operator has taken care to load another cassette with a new set of discs which, following replacement of the former cassette, now empty, by the loaded cassette, will undergo the same process as the preceding set.

The operations can then be repeated until the complete loading of the library DT.

If the response to the test of operation 121 is negative, the computer O will indicate an error (operation 132) and the programme is interrupted.

If the response to the test of operation 123 is negative, computer O indicates an error (operation 133) and the program goes to the test of operation 130 in order to verify whether the end of the list established by the operation 120 has been reached.

If the response to test 127 is positive, this says that a disc with the same catalogue reference is already present in library DT. A double presence of a given disc can be useful for the personnel responsible for the audio programme to be broadcast, for example in order to be able to effect an audio dissolve over two areas of a disc having the same catalogue reference.

Nevertheless, the programme then passes to operation 134 in the course of which a specific identification number is attributed to such duplicate disc copy. Following operation 134, the programme then passes to operation 128 in order to file such disc into its designated location.

The entire loading programme is terminated by operation 134 in the course of which computer O flags with an availability signal all the references of the loaded discs which it keeps in memory.

When all the desired discs are loaded into library DT (to be noted that from the beginning it is possible to decide not to load it completely), the operator can compose an audio programme to be broadcast. In order to accomplish this, computer O is programmed so as, on the one hand, to introduce into one or more readers 2 the discs to be read and, on the other hand, to control such readers in order that they read the area or areas of the discs forming part of the audio programme to be broadcast at the desired moment.

According to the detailed description which has preceded, it is superfluous to describe in detail the operations which consist in loading and unloading readers 2 with the discs found in the library.

Effectively, such operations, which serve to execute an audio programme previously set up, can be programmed with the help of computer O; thus, it is possible to compose for example a daily programme for broadcasting a day of audio theme illustration for a radio-broadcast programme. Since the installation includes a substantial number of readers 2 (for example 12 in the case shown, which number can be different), it may be envisaged to broadcast several programmes at the same time, the changing of discs required by such programmes being capable of execution with the help of the transfer arrangement 8 described hereinabove.

Specialists will understand that in other applications, those of a computer library, for example, the same principles apply with due change of the details.

It will also be understood that by means of a priority convention suitably programmed in computer O, the loading of discs into the library can be accomplished even in the course of running of an audio programme to be broadcast. This constitutes one of the decisive advantages of the installation according to the invention. As is well understood, the priority of disc transfer must then always be given to those of the discs which must be used for the audio programme to be broadcast.

FIG. 25 shows the flow chart of a programme intended to be executed when discs D must be removed from the library DT.

To accomplish this, the operator places an empty cassette 7 in the installation in the manner already described with reference to FIGS. 21, 22 and 23.

At 135, the operator creates the list of discs to be removed by introducing the references to such discs into the computer.

At the beginning of the execution of such computer programme, computer O will verify initially at 136 if library DT is empty or not.

In the case of a negative response to such test, the programme goes to the following test at 137 in order to verify whether the first disc of the list established at 135 is found in the library DT. In the case of a positive answer to this question, computer O orders up a transfer cycle for the transfer arrangement 8 in order that it search for the disc in question at the location where it is to be found in the library and that it place such disc in the first free location of cassette 7 (operation 138).

Then the computer O erases reference to such disc from the list of discs present in the library (operation 139).

The programme then carries out a test at 140 in order to verify if other discs are still to be removed according to the list established at 135. If yes, a reiteration is made over operations 136 and 140 until such list is exhausted. As soon as this occurs, the response to test 140 will be negative and the programme then passes to an operation at 141 consisting in marking the removed discs (the references of which are preferably stored in the computer memory) as being absent from the library DT.

It is evident for specialists that the running of the programmes illustrated by their respective flow charts in FIGS. 24 and 25 may be conceived in a manner such that a cassette 7 loaded with discs D to be placed in library DT can progressively be emptied at the same time that it is loaded with discs D which must be removed from the library.

If the answers to tests 136 and 137 are respectively positive and negative, the programme indicates an error (operations 142 and 143).

Figure 26:
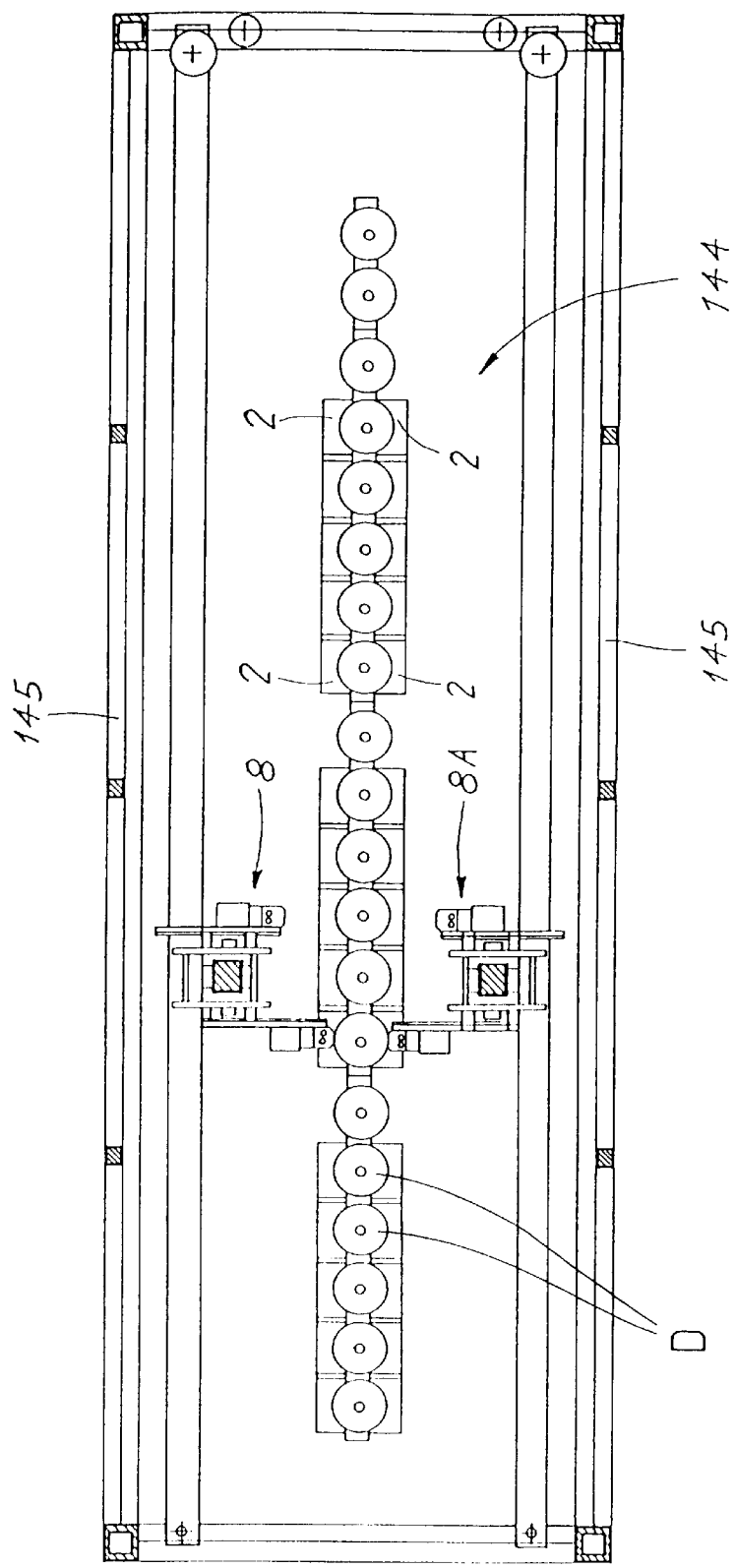
FIG. 26 is a plan view to the same scale as that of FIGS. 1 to 3 of another embodiment of the invention.
Figure 27:
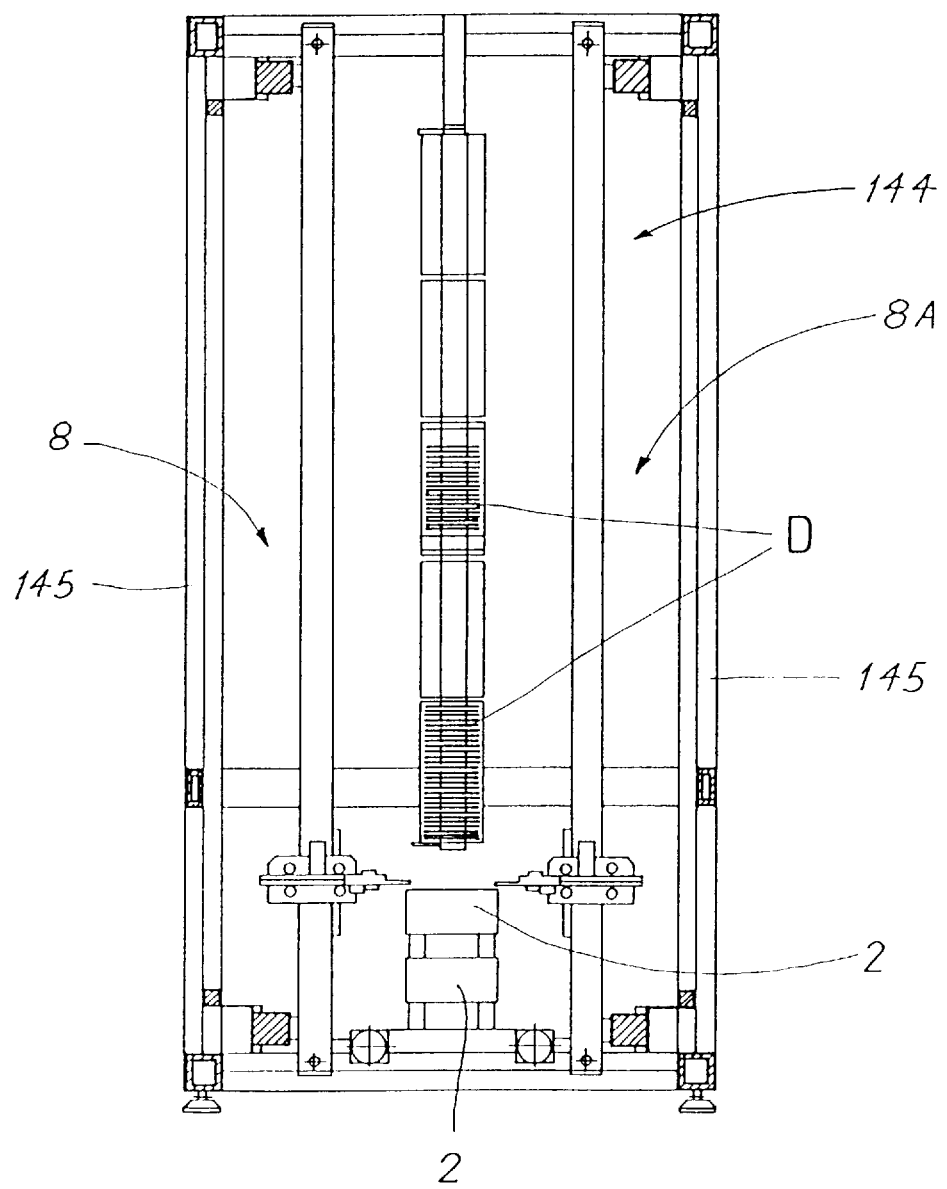
FIG. 27 is a side elevation view of the embodiment shown on FIG. 26.

Reference will now be had to FIGS. 26 and 27 which show an advantageous embodiment of the installation according to the invention.

In this case, the library DT as well as the battery of readers 2 are placed in an enclosure 144 symmetrically, relative to its two main vertical walls 145. This installation further includes two transfer arrangements 8 and 8A respectively placed along each of such walls and both servicing the same library DT.

Readers 2 can then be placed under library DT in a manner adapted so as to be loaded and unloaded respectively by the transfer arrangements 8 and 8A. The latter are furthermore identical to that described hereinabove with reference to FIGS. 4, 5 and 7 to 9.

The advantage of this embodiment consists in that the disc transfer operations can be executed twice as fast which can be important when the frequency of use of numerous different discs is high and/or that the storage capacity of the library is great.

Figure 28:
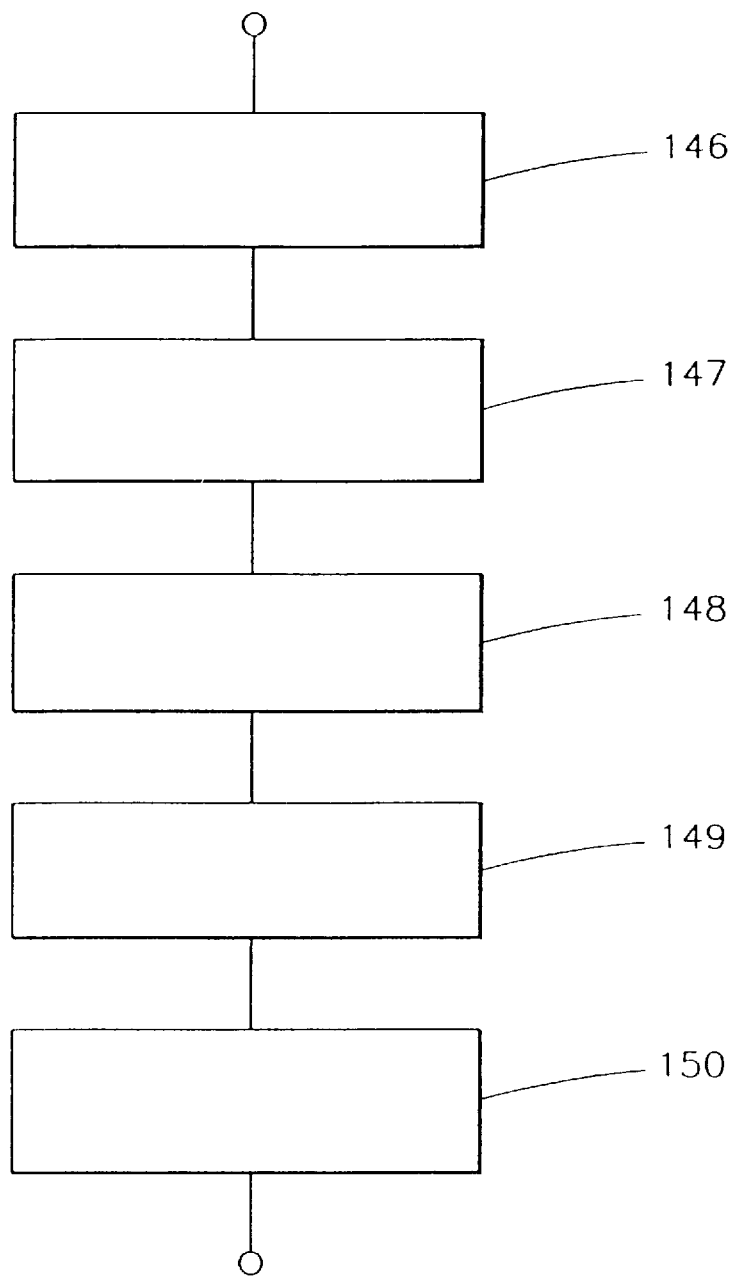
FIG. 28 shows a flow chart illustrating a specific aspect of the operation of the installation according to the invention.

FIG. 28 illustrates an advantageous characteristic of the invention concerning the construction of the transfer arrangement 8. It is recalled in referring to FIGS. 4 and 5 that such arrangement includes a grasping carriage 13 fitted out with two grasping clamps 20 and 20A.

FIG. 28 shows a greatly simplified flow chart of a programme for controlling such clamps 20 and 20A aiming to render the transfer operations of disc D as rapid as possible. Such programme is applicable moreover whether the exchange takes place for loading/unloading a reader 2 or filling or emptying all or part of the library through the cassette 7.

Thus, in considering only the exchange of discs in a reader 2 at 146, the computer O controls the transfer arrangement 8 in a manner such that clamp 20 grasps a "new" disc D. In 147, the transfer arrangement is controlled so as to be displaced towards a reader 2.

In 148, clamp 20A is then controlled in order to take up the "former" disc D from reader 2 after which clamp places the "new" disc in the reader (operation 149). Then the transfer arrangement 8 is controlled so that the mer disc is filed in its appropriate location in the library (operation 150).

As is well understood, the presence of two clamps and 20A on the same transfer arrangement 8 also enables, means of a minimum course of carriage 13, loading two readers 2 from two different locations in the library, each clamp then transferring its disc for loading or unloading at the same time as the other clamp.

What we claim is:

1. An installation for recording on or reading from information carriers, said installation comprising:

an enclosure;

a record library disposed within said enclosure and having a plurality of storage locations arranged along a record-library plane for receiving information carriers;

means at each of said storage locations for maintaining an information carrier in place and allowing introduction and retrieval of an information carrier into or from the storage location along a first direction;

loading/unloading means having a plurality of temporary storage locations with means at each of said temporary storage locations for maintaining an information carrier in place and allowing introduction of an information carrier into or from a temporary storage location along said first direction;

means for moving said loading/unloading means in a second direction, perpendicular to said first direction, between a load/unload position at which information carriers are inserted therein and a second stationary position, said second position being adjacent said record library inside said enclosure;

reading/recording means for reading from or recording on an information carrier; and, a transfer means including first means movable in said first direction for introducing and retrieving information carriers from said storage locations and second means for moving said first means in third and fourth directions, said third and fourth directions being perpendicular to each other and lying in a frontal plane normal to said first direction and offset from and parallel with said record-library plane to thereby transport information carriers between said storage locations and said reading/recording means and, when said loading/unloading means is in said second position, transporting information carriers between said storage locations and said temporary storage locations, means for supporting said loading/unloading means for being movable in said second direction along a path lying substantially in said record-library plane offset from said frontal plane whereby said loading/unloading means is adapted to be moved between said load/unload position and said second stationary position while said transfer means is moving in said frontal plane, wherein said frontal plane is vertical and said first means of said transfer means includes grasping means for grasping said information carriers, said grasping means being displaceable along said third and fourth directions, wherein said transfer means further comprises an input/output mechanism at said reading/recording means for:

taking said information carriers from said grasping means before said information carriers are transferred to said reading/recording means and thereafter transferring said information carriers to said reading/recording means; and taking said information carriers from said reading/recording means before said information carriers are transferred to said grasping means and thereafter transferring said information carriers to said grasping means;

when said information carriers are inserted into and taken from said reading/recording means, wherein each storage location comprises two retention elements in comb form placed to face one another at a distance approximately equal to a dimension of said carriers up against two opposite walls of each location, said combs being provided with elastic means enabling the elastic retention of said carriers.

* * * * *